(12) United States Patent
Kim

(10) Patent No.: US 12,088,174 B2
(45) Date of Patent: Sep. 10, 2024

(54) MOTOR

(71) Applicant: LG INNOTEK CO., LTD., Seoul (KR)

(72) Inventor: Yong Chul Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 235 days.

(21) Appl. No.: 17/756,673

(22) PCT Filed: Nov. 11, 2020

(86) PCT No.: PCT/KR2020/015744
§ 371 (c)(1),
(2) Date: May 31, 2022

(87) PCT Pub. No.: WO2021/125562
PCT Pub. Date: Jun. 24, 2021

(65) Prior Publication Data
US 2022/0385135 A1 Dec. 1, 2022

(30) Foreign Application Priority Data

Dec. 17, 2019 (KR) .................. 10-2019-0169009
Dec. 17, 2019 (KR) .................. 10-2019-0169010

(51) Int. Cl.
*H02K 5/04* (2006.01)
*B62D 5/04* (2006.01)
(Continued)

(52) U.S. Cl.
CPC .............. *H02K 5/225* (2013.01); *B62D 5/04* (2013.01); *H02K 3/50* (2013.01); *H02K 2203/09* (2013.01)

(58) Field of Classification Search
CPC ...... H02K 3/50; H02K 5/225; H02K 2203/09; H02K 3/52; H02K 3/521; H02K 3/522;
(Continued)

(56) References Cited

U.S. PATENT DOCUMENTS

2016/0218578 A1* 7/2016 Yamada ................ H02K 3/522
2018/0316238 A1* 11/2018 Kong .................... B62D 5/0403
2018/0323670 A1* 11/2018 Sambuichi ............. H02K 3/28

FOREIGN PATENT DOCUMENTS

JP 2013-212008 A 10/2013
JP 2018-74907 A 5/2018
(Continued)

OTHER PUBLICATIONS

International Search Report dated Feb. 22, 2021 in International Application No. PCT/KR2020/015744.

*Primary Examiner* — Alexander A Singh
(74) *Attorney, Agent, or Firm* — Saliwanchik, Lloyd & Eisenschenk

(57) ABSTRACT

Disclosed is a motor comprising: a housing; a stator arranged in the housing; a rotor arranged in the stator; and a first bus bar arranged under the stator, wherein the first bus bar includes a plurality of neutral terminals which are connected to a coil of the stator, are separated by circuitry, and are arranged to be rotationally symmetrical with respect to one another based on the center of the stator. Accordingly, terminals of identical shapes are combined to implement terminals that are respectively connected to four circuits separated from one another, and thus, advantageous effects of ensuring accurate positions of the terminals and simplifying assembling processes are provided during the processes of molding the bus bar.

18 Claims, 20 Drawing Sheets

(51) Int. Cl.
*H02K 3/50* (2006.01)
*H02K 5/22* (2006.01)

(58) Field of Classification Search
CPC . H02K 3/38; H02K 3/505; H02K 3/28; B62D 5/0403; B62D 5/04
USPC .......................................................... 310/71
See application file for complete search history.

(56) References Cited

FOREIGN PATENT DOCUMENTS

| | | | |
|---|---|---|---|
| KR | 10-2017-0052980 A | 5/2017 |
| KR | 10-2017-0128718 A | 11/2017 |
| KR | 10-2019-0024052 A | 3/2019 |

\* cited by examiner

112(114, 116, 122, 124, 126, 132, 134, 136, 142, 144, 146)

112(114, 116, 122, 124, 126, 132, 134, 136, 142, 144, 146)

MOTOR

CROSS-REFERENCE TO RELATED APPLICATIONS

This application is the U.S. national stage application of International Patent Application No. PCT/KR2020/015744, filed Nov. 11, 2020, which claims the benefit under 35 U.S.C. § 119 of Korean Application Nos. 10-2019-0169009, filed Dec. 17, 2019; and 10-2019-0169010, filed Dec. 17, 2019; which the disclosures of each of which are incorporated herein by reference in their entirety.

TECHNICAL FIELD

The present invention relates to a motor.

BACKGROUND ART

An electric power steering (EPS) system is an apparatus which secures turning stability of a vehicle and rapidly provides a restoring force so that a driver can safely drive the vehicle. An EPS system controls a vehicle's steering shaft to be driven by driving a motor using an electronic control unit (ECU) according to driving conditions detected by a vehicle speed sensor, a torque angle sensor, a torque sensor, and the like.

A motor includes a rotor and a stator. Coils are wound around the stator. Connection ends of the coils wound around the stator may be connected to a busbar. The busbar includes a body and terminals. The terminals are connected to the connection ends of the coils. In addition, the terminals may be connected to an external power source through a cable.

The terminals may be formed as combinations of phase terminals connected to U-phase, V-phase, and W-phase power sources and neutral terminals connecting the phase terminals. In this case, in order to secure safety of the motor, the plurality of terminals of such combinations may be provided and circuit-divided. When an abnormality occurs at a circuit connected to any one terminal or an element connected to the circuit, driving of the motor can be secured through another terminal. The plurality of terminals are spatially divided in the body of the busbar (as separate circuits).

However, since connection ends of the terminals are disposed at equal intervals, terminals having various shapes may be required. When there are various shapes of the terminals, since the number of molds increases, there are problems that costs increase, loss of material is also large, and a manufacturing process is complicated.

In addition, in a process of injection molding the busbar, there are problems that errors of positions of the plurality of terminals occur easily, and it is difficult to visually check whether positions of the neutral terminals or phase terminals are correct.

Accordingly, various studies have been conducted to simplify an assembly process by unifying shapes of the plurality of terminals and accurately securing a positional error of the terminals, but they are still not enough, and thus development of such a terminal is urgently required.

DISCLOSURE

Technical Problem

The present invention is directed to providing a motor in which shapes of terminals are unified, accurate positions of the terminals are secured in a process of molding a busbar, and an assembly process is simplified.

The present invention is directed to providing a motor of which a degree of design freedom and space utilization are improved by simplifying a structure of a busbar to reduce a size of the busbar.

Objectives to be solved by the present invention are not limited to the above-described objectives, and other objectives which are not described above will be clearly understood from following descriptions by those skilled in the art.

Technical Solution

One aspect of the present invention provides a motor including a housing, a stator disposed in the housing, a rotor disposed in the stator, and a first busbar disposed under the stator, wherein the first busbar includes a plurality of neutral terminals connected to coils of the stator and circuit-divided, and the plurality of neutral terminals are disposed to be rotationally symmetrical with respect to a center of the stator.

The first busbar may include a first neutral terminal, a second neutral terminal, a third neutral terminal, and a fourth neutral terminal.

The first neutral terminal, the second neutral terminal, the third neutral terminal, and the fourth neutral terminal may be disposed at intervals of 90° to be rotationally symmetrical with respect to the center of the stator.

The first neutral terminal, the second neutral terminal, the third neutral terminal, and the fourth neutral terminal may be formed as identical structures.

Each of the neutral terminals may include a neutral terminal body and a protruding neutral terminal part extending from the neutral terminal body in a radial direction of the stator.

The first busbar may include a first body formed to surround the plurality of neutral terminals.

The first busbar may be supported by an inner surface of the housing.

The first body may include a first inner surface and a first outer surface, and the first outer surface may be supported to be pressed against the inner surface of the housing.

The protruding neutral terminal part may protrude toward the first inner surface.

The motor may include a second busbar disposed on the stator, wherein the second busbar may include a plurality of terminal modules connected to the coils of the stator and circuit-divided, and each of the terminal modules may include a plurality of phase terminals.

The second busbar may include a first terminal module circuit-connected to the first neutral terminal, a second terminal module circuit-connected to the second neutral terminal, a third terminal module circuit-connected to the third neutral terminal, and a fourth terminal module circuit-connected to the fourth neutral terminal.

The first terminal module, the second terminal module, the third terminal module, and the fourth terminal module may be disposed to be rotationally symmetrical with respect to the center of the stator.

The first terminal module, the second terminal module, the third terminal module, and the fourth terminal module may be disposed at intervals of 90° to be rotationally symmetrical with respect to the center of the stator.

The first terminal module may include a 1-1 phase terminal, a 1-2 phase terminal, and a 1-3 phase terminal which are disposed to be spaced at intervals of 30° about the center of the stator, the second terminal module may include a 2-1 phase terminal, a 2-2 phase terminal, and a 2-3 phase terminal which are disposed to be spaced at intervals of 30° about the center of the stator, the third terminal module may include a 3-1 phase terminal, a 3-2 phase terminal, and a 3-3 phase terminal which are disposed to be spaced at intervals of 30° about the center of the stator, and the fourth terminal module may include a 4-1 phase terminal, a 4-2 phase terminal, and a 4-3 phase terminal which are disposed to be spaced at intervals of 30° about the center of the stator. The 1-1 phase terminal, the 1-2 phase terminal, the 1-3 phase terminal, the 2-1 phase terminal, the 2-2 phase terminal, the 2-3 phase terminal, the 3-1 phase terminal, the 3-2 phase terminal, the 3-3 phase terminal, the 4-1 phase terminal, the 4-2 phase terminal, and the 4-3 phase terminal may be formed as identical structures.

Each of the phase terminals may include a phase terminal body and a protruding phase terminal part extending from the phase terminal body in a radial direction of the stator.

The second busbar may include a second mold formed to surround the plurality of phase terminals.

Another aspect of the present invention provides a motor including a shaft, a rotor coupled to the shaft, a stator disposed outside the rotor, and a busbar disposed on the stator, wherein the busbar includes a body including a first inner surface and a first outer surface and a plurality of terminal modules connected to coils of the stator and circuit-divided, and the terminal modules include phase terminals exposed from the first outer surface and neutral terminals exposed from the first inner surface.

The busbar may include a first terminal module, a second terminal module, a third terminal module, and a fourth terminal module.

The plurality of terminal module may be disposed to be rotationally symmetrical with respect to a center of the stator.

The first terminal module, the second terminal module, the third terminal module, and the fourth terminal module may be disposed at intervals of 90° to be rotationally symmetrical with respect to the center of the stator.

The first terminal module may include a 1-1 phase terminal, a 1-2 phase terminal, and a 1-3 phase terminal which are exposed from the first outer surface and a first neutral terminal exposed from the first inner surface, the second terminal module may include a 2-1 phase terminal, a 2-2 phase terminal, and a 2-3 phase terminal which are exposed from the first outer surface and a second neutral terminal exposed from the first inner surface, the third terminal module may include a 3-1 phase terminal, a 3-2 phase terminal, and a 3-3 phase terminal exposed from the first outer surface and a third neutral terminal exposed from the first inner surface, and the fourth terminal module may include a 4-1 phase terminal, a 4-2 phase terminal, and a 4-3 phase terminal exposed from the first outer surface and a fourth neutral terminal exposed from the first inner surface.

The 1-1 phase terminal, the 2-1 phase terminal, the 3-1 phase terminal, and the 4-1 phase terminal may be formed as identical structures, the 1-2 phase terminal, the 2-2 phase terminal, the 3-2 phase terminal, and the 4-2 phase terminal may be formed as identical structures, the 1-3 phase terminal, the 2-3 phase terminal, the 3-3 phase terminal, and the 4-3 phase terminal may be formed as identical structures, and the first neutral terminal, the second neutral terminal, the third neutral terminal, and the fourth neutral terminal may be formed as identical structures.

Each of the phase terminals may include a phase terminal body disposed in the body and a protruding phase terminal part extending from the phase terminal body and protruding from the first outer surface in a radial direction of the stator, and each of the neutral terminals may include a neutral terminal body disposed in the body and a protruding neutral terminal part extending from the neutral terminal body and protruding from the first inner surface in the radial direction of the stator.

The phase terminals and the neutral terminals may be disposed to form layers different from each other in an axial direction of the shaft.

The phase terminal body may be disposed to form a first layer in the body, and the neutral terminal may be disposed to form a second layer disposed on or under the phase terminal in the body.

The phase terminals and the neutral terminals may be disposed to form the same layer in an axial direction of the shaft.

The phase terminal body may be disposed to form a first layer in the body, and the neutral terminal may be disposed to form the first layer in the body.

Advantageous Effects

According to embodiments, since terminals having the same shapes are combined to implement terminals connected to four divided circuits, advantageous effects of securing accurate positions of the terminals in a process of molding a busbar and simplifying an assembly process are provided.

According to the embodiments, advantageous effects of reducing a size of the busbar and improving a degree of design freedom and space utilization can be obtained by simplifying a structure of the busbar.

According to the embodiments, since terminals having the same shapes are combined to implement terminals connected to four divided circuits, advantageous effects of securing accurate positions of the terminals in a process of molding a busbar and simplifying an assembly process are provided.

According to the embodiments, although the plurality of terminals have the same shapes, since it is easy to arrange protruding parts of the terminals at equal intervals, an advantageous effect of improving insulation stability is provided.

Various useful advantages and effects of embodiments are not limited to the above-described content and may be more easily understood when specific embodiments are described.

MODES OF THE INVENTION

Figure 1:
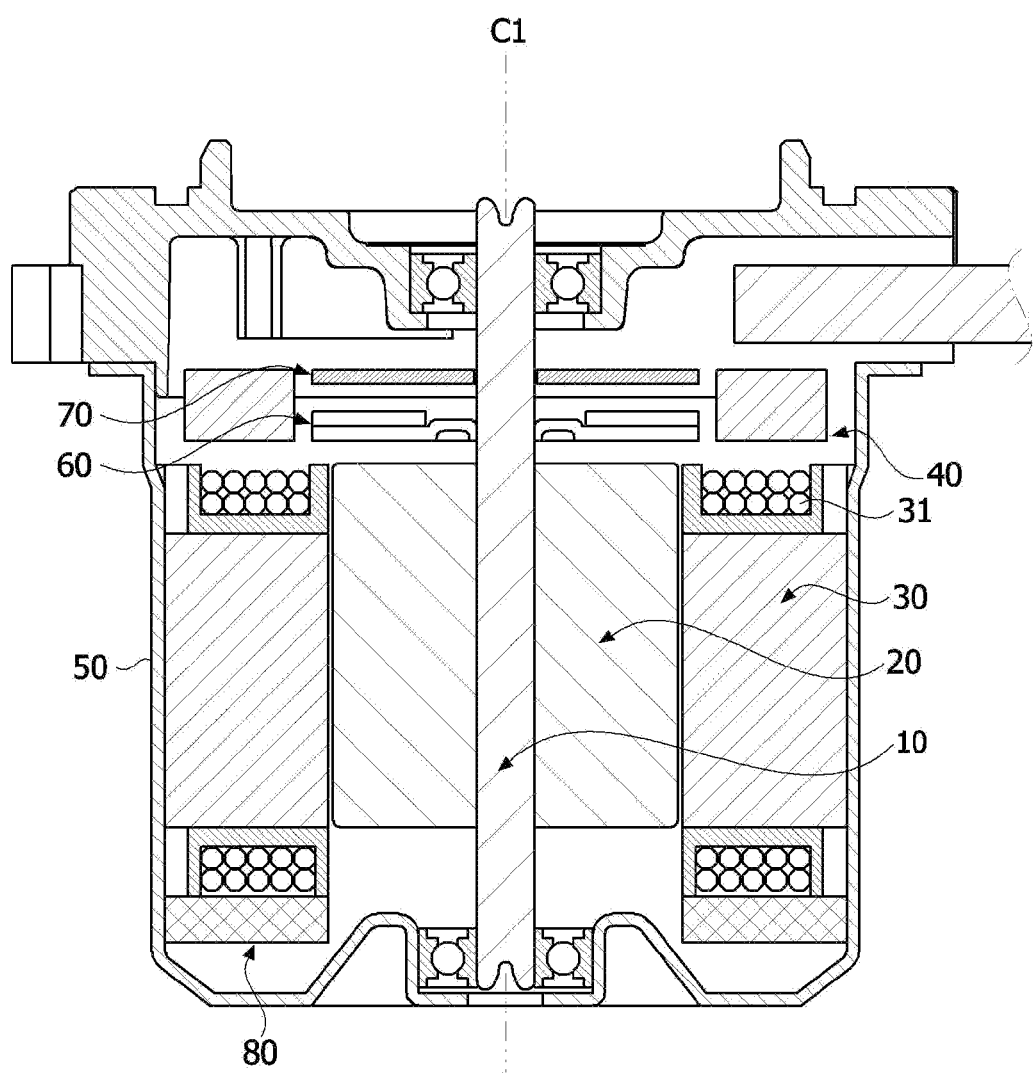
FIG. 1 is a cross-sectional view illustrating a motor according to a first embodiment.

Hereinafter, exemplary embodiments of the present invention will be described in detail with reference the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

FIRST EMBODIMENT

Referring to FIGS. 1 to 9, a motor according to a first embodiment includes a housing 50, a stator 30 disposed in the housing 50, a rotor 20 disposed in the stator 30, a first busbar 80 disposed under the stator 30, and a second busbar 40 disposed on the stator 30.

The housing 50 is provided to have an accommodation space therein, and the stator 30 and the rotor 20 are disposed in the housing 50.

The shaft 10 may be coupled to the rotor 20, when an electromagnetic interaction occurs between the rotor 20 and the stator 30 due to the supply of a current, the rotor 20 rotates, and the shaft 10 rotates in conjunction with the rotor 20. As an example, the shaft 10 may be connected to a vehicle's steering shaft and may transmit power to the vehicle's steering shaft.

The rotor 20 is rotatably disposed in the stator 30 and rotates through an electrical interaction with the stator 30.

The rotor 20 may include a rotor core and magnets. As an example, the rotor core may be formed in a form in which a plurality of thin circular steel plates are stacked or a single container form.

A hole (not shown) to be coupled to the shaft 10 may be formed in a central portion of the rotor core. Protrusions (not shown) which guide the magnets (not shown) may protrude toward an outer circumferential surface of the rotor core. The magnets may be attached to the outer circumferential surface of the rotor core. The plurality of magnets may be disposed at predetermined intervals along a circumference of the rotor core.

In addition, the rotor 20 may include a can member (not shown) which surrounds the magnets to fix the magnets not to separate from the rotor core and inhibits the magnets from being exposed.

Coils 31 may be wound around the stator 30 to induce the electrical interaction with the rotor 20.

A specific structure for winding the coils 31 around the stator 30 will be described below. The stator 30 may include a stator core (not shown) including a plurality of teeth (not shown). The stator core may include an annular yoke (not shown) and the plurality of teeth which protrude from the yoke in a central direction and around which the coils 31 are wound. In this case, the central direction may be a radial direction. The teeth may be formed at predetermined intervals along the yoke in a circumferential direction. Meanwhile, the stator core may be formed by a plurality of thin steel plates being stacked. In addition, the stator core may be formed by a plurality of divided cores being coupled or connected.

In addition, a sensing magnet 60 which is coupled to the shaft 10 and operates in conjunction with the rotor 20 is formed in the housing. In this case, the sensing magnet 60 is a device for detecting a position of the rotor 20.

A sensor which detects a magnetic force of the sensing magnet 60 may be disposed on a printed circuit board 70. As an example, the sensor may be a Hall integrated circuit (IC). In this case, the sensor detects changes in an N-pole and an S-pole of the sensing magnet 60 and generates a sensing signal.

The second busbar 40 may include a plurality of terminal modules 110, 120, 130, and 140 which are connected to the coils 31 of the stator 30 and circuit-divided from each other and a second body 42 and be disposed on the stator 30.

Figure 9:
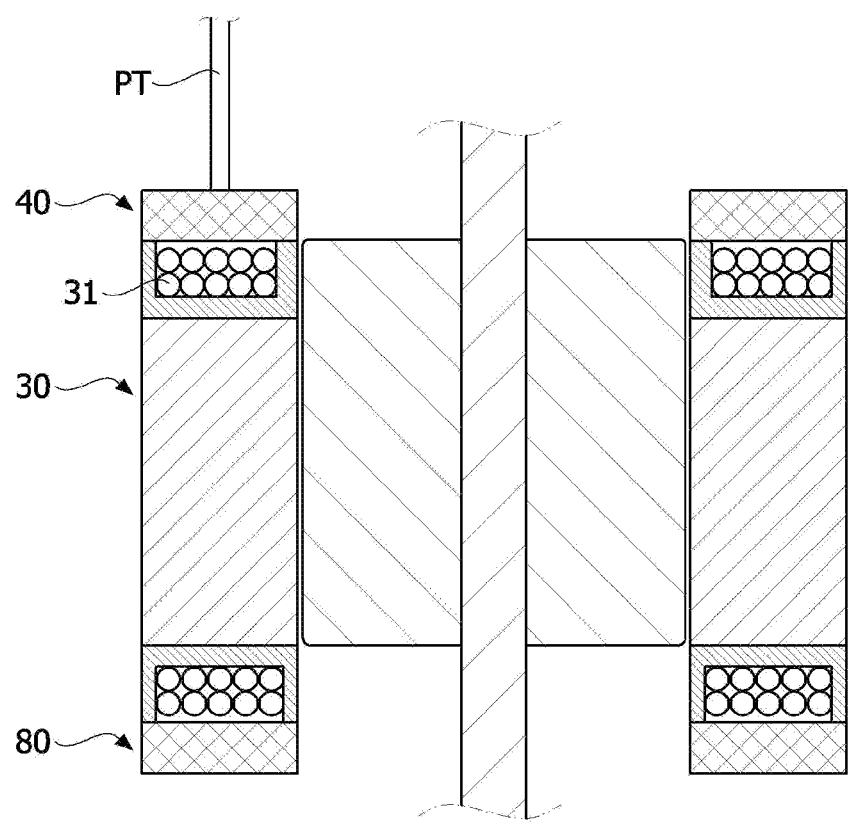
FIG. 9 is a view for describing a connection structure of the second busbar and a power terminal in the motor according to the first embodiment.

As an example, the second busbar 40 may be formed as a structure including the annular second body 42 and the plurality of terminal modules disposed in the second body 42, and power terminals PT through which power is applied are connected to an upper portion of the second busbar 40 (see FIG. 9).

The second body 42 may be a molded part formed in an injection molding manner. The second body 42 includes a hole (not shown) in a central portion thereof. The plurality of terminal modules 110, 120, 130, and 140 are disposed in the second body 42, and parts of end portions of the terminal modules 110, 120, 130, and 140 are disposed to be exposed to the outside of the second body 42. In addition, the second body 42 may have a multilayer or single layer structure in an axial direction. In this case, the axial direction may be a longitudinal direction of the shaft 10.

The second busbar 40 may be formed so that the plurality of terminal modules 110, 120, 130, and 140, which are circuit-divided, are formed. The second busbar 40 may include a plurality of phase terminals connected to U-phase, V-phase, and W-phase power sources.

Figure 7:
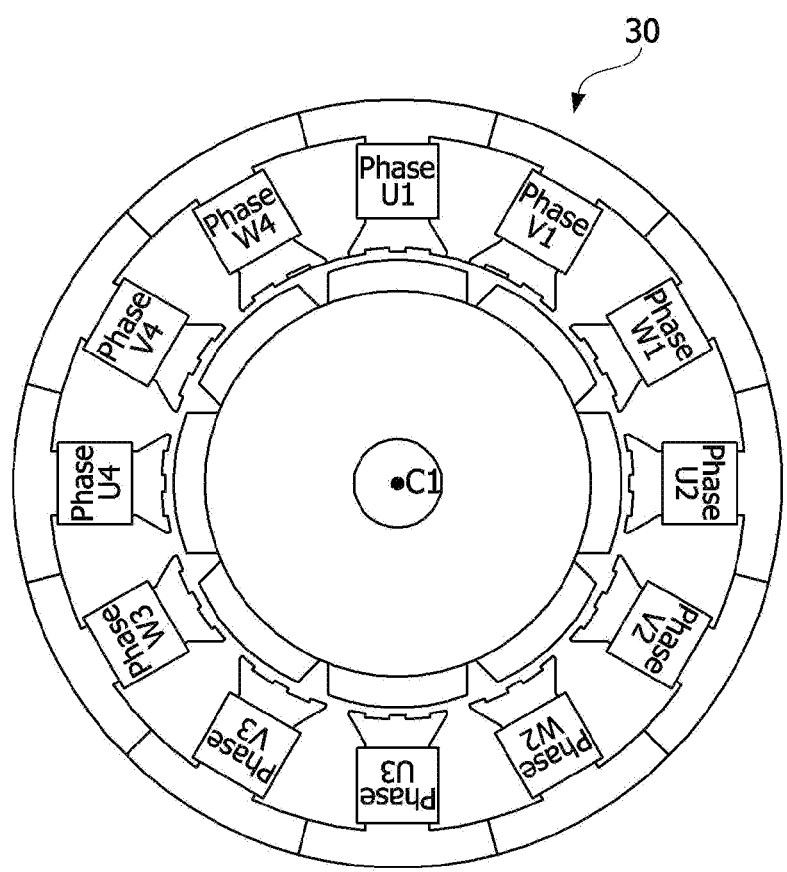
FIG. 7 is a view for describing a winding structure of a coil in the motor according to the first embodiment.
Figure 8:
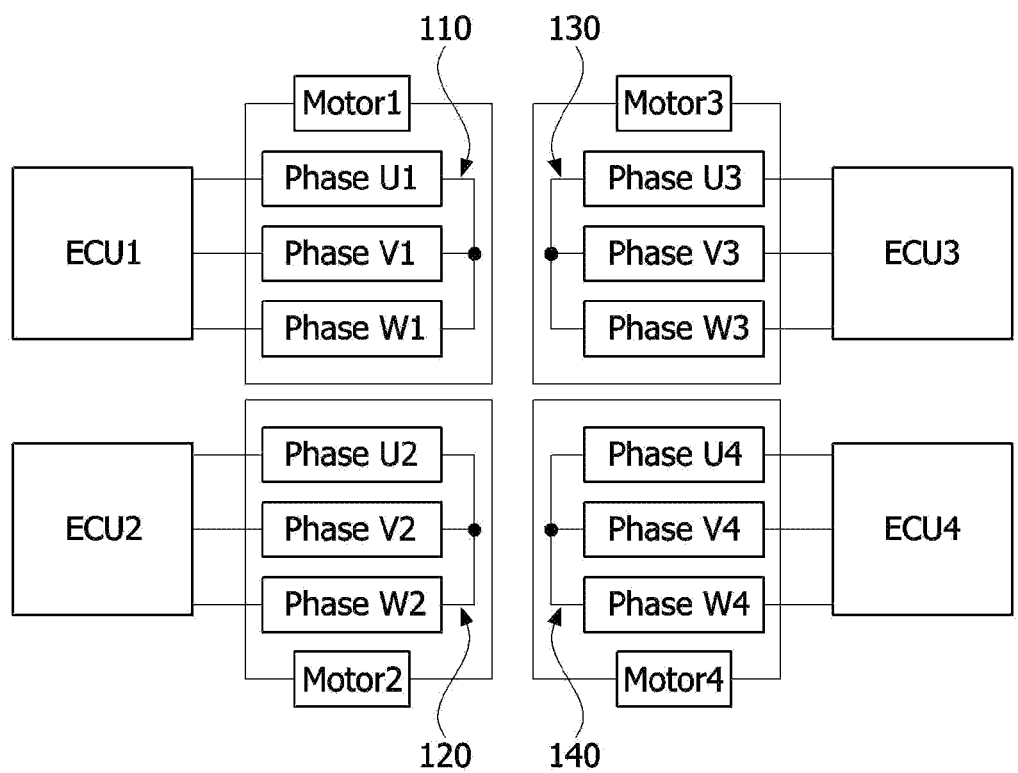
FIG. 8 is a view for describing a control circuit in the motor according to the first embodiment.

For reference, in the embodiment, the plurality of terminal modules 110, 120, 130, and 140 being circuit-divided may be defined as the plurality of terminal modules 110, 120, 130, and 140 being connected to the coils 31 of the stator 30 but being divided and forming motor control circuits independent of each other (see FIGS. 7 and 8).

Figure 2:
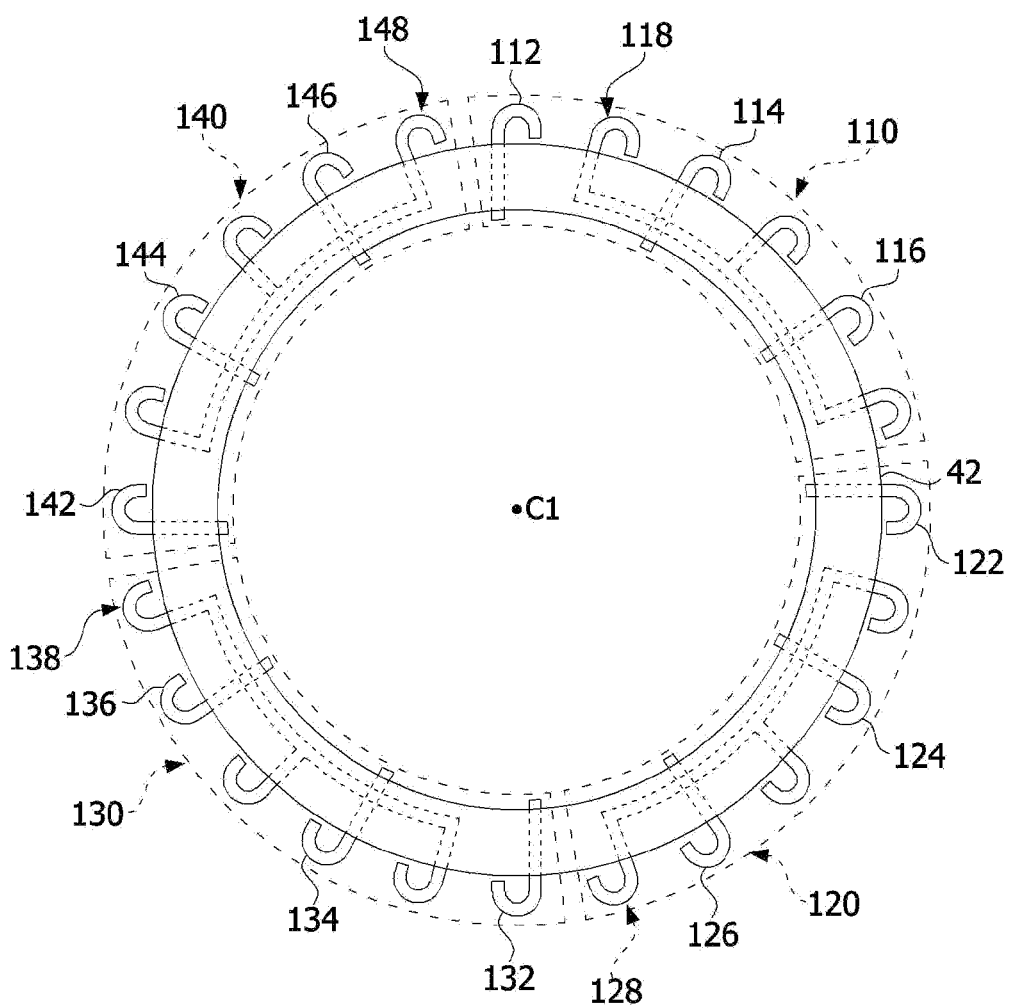
FIG. 2 is a plan view for describing a layout of a first busbar and a second busbar in the motor according to the first embodiment.

According to the exemplary embodiment, the second busbar 40 may include a first terminal module 110, a second terminal module 120, a third terminal module 130, and a fourth terminal module 140 which are circuit-divided (see FIGS. 2 and 8).

For reference, although an example of the second busbar 40 including four terminal modules circuit-divided has been described in the embodiment, according to another embodiment of the present invention, a terminal unit may also include three or fewer or five or more terminal modules which are circuit-divided.

The first terminal module 110, the second terminal module 120, the third terminal module 130, and the fourth terminal module 140 are disposed to be rotationally symmetrical with respect to a center of the stator 30 (or a center of the second busbar).

For reference, the first terminal module 110, the second terminal module 120, the third terminal module 130, and the fourth terminal module 140 may be disposed to form the same layer or different layers in the axial direction of the shaft 10. Hereinafter, an example in which the first terminal module 110, the second terminal module 120, the third terminal module 130, and the fourth terminal module 140 are formed on a single layer will be described.

Preferably, the first terminal module 110, the second terminal module 120, the third terminal module 130, and the fourth terminal module 140 are disposed to be spaced at intervals of 90° to be rotationally symmetrical with respect to a center C1 of the stator 30.

This is to simplify a manufacturing process of the terminal modules 110, 120, 130, and 140 and reduce manufacturing costs.

That is, in order to manufacture the plurality of terminal modules 110, 120, 130, and 140 which are circuit-divided, various terminals having different shapes for each position of the terminal modules should be provided. In this case, since the number of molds for manufacturing the terminals also inevitably increases to manufacture various types of terminals, there are problems that a manufacturing process is complicated, and manufacturing costs increase.

However, in the embodiment, since only one type of terminal module can be commonly used to manufacture the plurality of terminal modules 110, 120, 130, and 140 which are circuit-divided, advantageous effects of minimizing the number of molds for manufacturing the terminal modules 110, 120, 130, and 140, simplifying a manufacturing process, and reducing manufacturing costs can be obtained.

More specifically, the first terminal module 110 may include three phase terminals, the second terminal module 120 may include three phase terminals, the third terminal module 130 may include three phase terminals, and the fourth terminal module 140 may include three phase terminals.

As an example, the first terminal module 110 may include a 1-1 phase terminal 112 (for example, of a U1-phase), a 1-2 phase terminal 114 (for example, of a V1-phase), and a 1-3 phase terminal 116 (for example, of a W1-phase) which are disposed to be spaced at intervals of 30° about the center C1 of the stator 30.

The second terminal module 120 may include a 2-1 phase terminal 122 (for example, of a U2-phase), a 2-2 phase terminal 124 (for example, of a V2-phase), and a 2-3 phase terminal 126 (for example, of a W2-phase) which are disposed to be spaced at intervals of 30° about the center C1 of the stator 30.

The third terminal module 130 may include a 3-1 phase terminal 132 (for example, of a U3-phase), a 3-2 phase terminal 134 (for example, of a V3-phase), and a 3-3 phase terminal 136 (for example, of a W3-phase) which are disposed to be spaced at intervals of 30° about the center C1 of the stator 30.

The fourth terminal module 140 may include a 4-1 phase terminal 142 (for example, of a U4-phase), a 4-2 phase terminal 144 (for example, of a V4-phase), and a 4-3 phase terminal 146 (for example, of a W4-phase) which are disposed to be spaced at intervals of 30° about the center C1 of the stator 30.

Referring to FIG. 2, the 1-1 phase terminal 112 is disposed in a 12 o'clock direction (based on FIG. 2) about the center C1 of the stator 30, the 1-2 phase terminal 114 is disposed to be spaced 30° from the 1-1 phase terminal 112 about the center C1 of the stator 30, and the 1-3 phase terminal 116 is disposed to be spaced 30° from the 1-2 phase terminal 114 about the center C1 of the stator 30. As an example, the 1-1 phase terminal 112, the 1-2 phase terminal 114, and the 1-3 phase terminal 116 may be disposed in a first quadrant among quadrants divided based on perpendicular axes (an x-axis and a y-axis) passing through the center C1 of the stator 30.

The 2-1 phase terminal 122 is disposed in a 3 o'clock direction (based on FIG. 2) about the center C1 of the stator 30, the 2-2 phase terminal 124 is disposed to be spaced 30° from the 2-1 phase terminal 122 about the center C1 of the stator 30, and the 2-3 phase terminal 126 disposed to be spaced 30° from the 2-2 phase terminal 124 about the center C1 of the stator 30. As an example, the 2-1 phase terminal 122, the 2-2 phase terminal 124, and the 2-3 phase terminal 126 may be disposed in a fourth quadrant among the quadrants divided based on the perpendicular axes (the x-axis and the y-axis) passing through the center C1 of the stator 30.

The 3-1 phase terminal 132 is disposed in a 6 o'clock direction (based on FIG. 2) about the center C1 of the stator 30, the 3-2 phase terminal 134 is disposed to be spaced 30° from the 3-1 phase terminal 132 about the center C1 of the stator 30, and the 3-3 phase terminal 136 disposed to be spaced 30° from the 3-2 phase terminal 134 about the center C1 of the stator 30. As an example, the 3-1 phase terminal 132, the 3-2 phase terminal 134, and the 3-3 phase terminal 136 may be disposed in a third quadrant among the quadrants divided based on the perpendicular axes (the x-axis and the y-axis) passing through the center C1 of the stator 30.

The 4-1 phase terminal 142 is disposed in a 9 o'clock direction (based on FIG. 2) based on the center C1 of the stator 30, the 4-2 phase terminal 144 is disposed to be spaced 30° from the 4-1 phase terminal 142 about the center C1 of the stator 30, and the 4-3 phase terminal 146 is disposed to be spaced 30° from the 4-2 phase terminal 144 about the center C1 of the stator 30. As an example, the 4-1 phase terminal 142, the 4-2 phase terminal 144, and the 4-3 phase terminal 146 may be disposed in a second quadrant among the quadrants divided based on the perpendicular axes (the x-axis and the y-axis) passing through the center C1 of the stator 30.

More specifically, the 1-1 phase terminal 112 disposed in the 12 o'clock direction about the center C1 of the stator 30, and the 1-2 phase terminal 114, the 1-3 phase terminal 116, the 2-1 phase terminal 122, the 2-2 phase terminal 124, the 2-3 phase terminal 126, the 3-1 phase terminal 132, the 3-2 phase terminal 134, the 3-3 phase terminal 136, the 4-1 phase terminal 142, the 4-2 phase terminal 144, and the 4-3 phase terminal 146 are sequentially disposed to be spaced at intervals of 30° in a clockwise direction.

Preferably, the 1-1 phase terminal 112, the 1-2 phase terminal 114, the 1-3 phase terminal 116, the 2-1 phase terminal 122, the 2-2 phase terminal 124, the 2-3 phase terminal 126, the 3-1 phase terminal 132, the 3-2 phase terminal 134, the 3-3 phase terminal 136, the 4-1 phase terminal 142, the 4-2 phase terminal 144, and the 4-3 phase terminal 146 are formed as identical structures (identical shapes). Accordingly, since one mold can be commonly used to manufacture the plurality of phase terminals constituting four independent terminal modules which are different from each other, there are advantages in that a manufacturing process is simple, and manufacturing costs are reduced.

Figure 4:
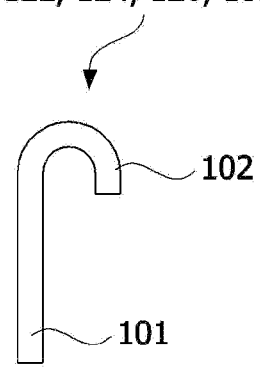
FIG. 4 is a plan view for describing a phase terminal of the second busbar in the motor according to the first embodiment.

Referring to FIG. 4, each of the plurality of phase terminals (the 1-1 phase terminal, the 1-2 phase terminal, the 1-3 phase terminal, the 2-1 phase terminal, the 2-2 phase terminal, the 2-3 phase terminal, the 3-1 phase terminal, the 3-2 phase terminal, the 3-3 phase terminal, the 4-1 phase terminal, the 4-2 phase terminal, and the 4-3 phase terminal) may include a phase terminal body 101 and a protruding phase terminal part 102 extending from the phase terminal body 101 in the radial direction of the stator 30. Hereinafter, the phase terminal body 101 and the protruding phase terminal part 102 will be described based on the 1-1 phase terminal 112.

The phase terminal body 101 may be formed in a straight band type member (or a band type member having an arc shape with a predetermined curvature). The phase terminal body 101 and the protruding phase terminal part 102 may be divided and described only according to shapes and functional features thereof and may be one integrally connected member.

Figure 3:
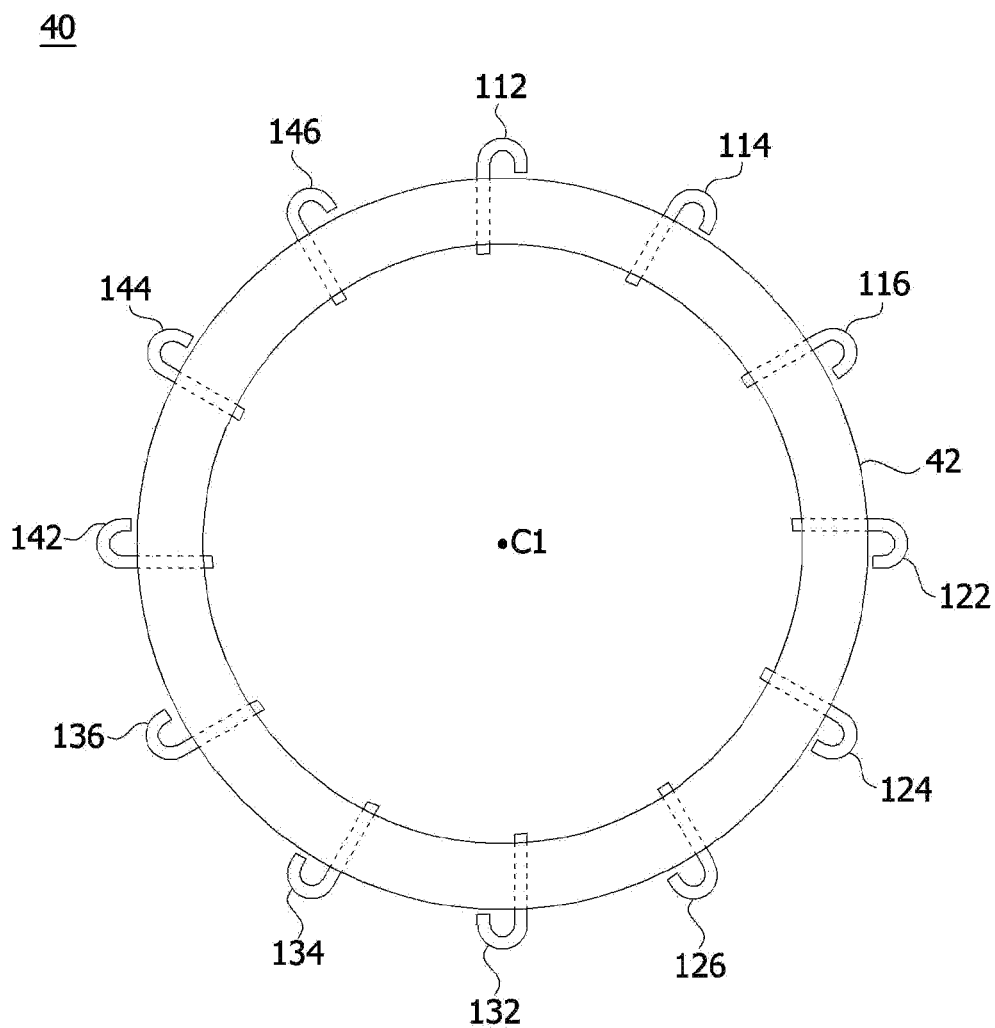
FIG. 3 is a plan view for describing the second busbar in the motor according to the first embodiment.

As an example, the phase terminal body 101 of the 1-1 phase terminal 112 may be formed as the straight band type member. As illustrated in FIGS. 2 and 3, an inner end portion of the phase terminal body 101 may be disposed to protrude toward an inner circumferential surface of the second body 42 in the radial direction.

The protruding phase terminal part 102 extends from the phase terminal body 101 in the radial direction of the stator 30 and protrudes outward from the first body 82. An end portion of the protruding phase terminal part 102 is formed to be bent like a hook.

The protruding phase terminal part 102 is electrically connected to the coil 31 of the stator 30. As an example, the protruding phase terminal part 102 may be fused to the coil 31 of the stator 30.

The phase terminal body 101 and the protruding phase terminal part 102 may be formed as a single layer structure or double layer structure (multilayer structure), and the present invention is not restricted or limited by a connection structure between the phase terminal body 101 and the protruding phase terminal part 102.

The first busbar 80 includes a plurality of neutral terminals 118, 128, 138, and 148 which are disposed under the stator 30, connected to the coils 31 of the stator 30, and circuit-divided from each other and a first body 82.

As an example, the first busbar 80 may be formed as a structure including the annular first body 82 and the plurality of neutral terminals 118, 128, 138, and 148 disposed in the first body 82.

The first body 82 may be a molded part formed in an injection molding manner. The first body 82 may include a hole (not shown) in a central portion thereof. The neutral terminals are disposed in the first body 82, and parts of end portions of the neutral terminals are disposed to be exposed outward from the first body 82. In addition, the first body 82 may have a multilayer structure or single layer structure.

This is to simplify a structure and a manufacturing process of the busbar (first busbar or second busbar) and arrange the neutral terminals 118, 128, 138, and 148 using a free space present under the stator.

That is, in the embodiment, since the phase terminals and the neutral terminals for constituting the plurality of terminal modules, which are circuit-divided, are structurally divided so that the neutral terminals are included in the first busbar 80 and the phase terminals are included in the second busbar 40, advantageous effects of simplifying structures and manufacturing processes of the first busbar 80 and the second busbar 40 can be obtained.

In addition, since the first busbar 80 including the neutral terminals is disposed in the free space disposed under the stator (between a lower portion of the stator and the housing), space utilization of an upper region of the stator and a degree of design freedom can be improved, and thus the first busbar 80 and the second busbar 40 for constituting a plurality of motor control circuits can be more easily disposed in the motor. Accordingly, advantageous effects of minimizing an increase in a size of the motor due to the phase terminals and the neutral terminals for constituting the plurality of motor control circuits being mounted and contributing to miniaturization of the motor can be obtained.

Figure 5:
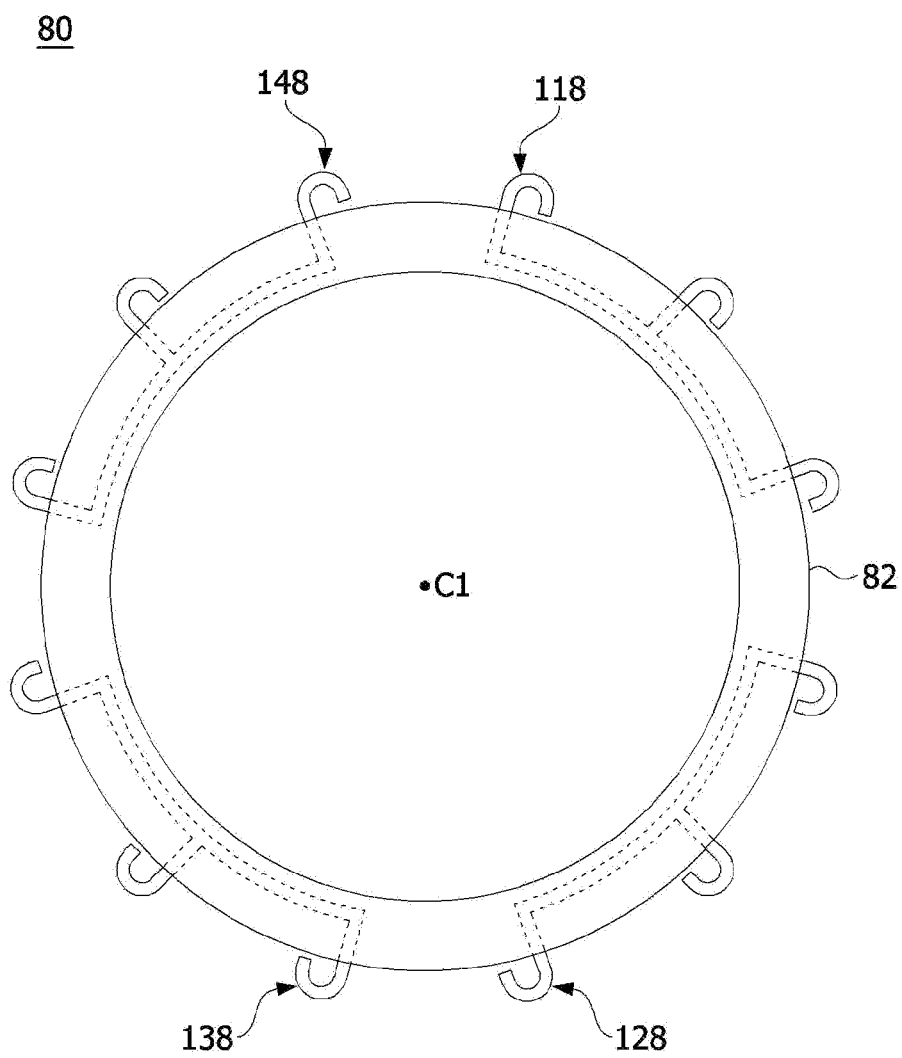
FIG. 5 is a plan view for describing the first busbar in the motor according to the first embodiment.

Referring to FIG. 5, the plurality of neutral terminals 118, 128, 138, and 148 are disposed to be rotationally symmetrical with respect to the center C of the stator 30.

According to the exemplary embodiment of the present invention, the first busbar 80 may include a first neutral terminal 118, a second neutral terminal 128, a third neutral terminal 138, and a fourth neutral terminal 148 which are (physically and electrically) circuit-divided.

More specifically, the first neutral terminal 118 is circuit-connected to the first terminal module 110, the second neutral terminal 128 is circuit-connected to the second terminal module 120, the third neutral terminal 138 is circuit-connected to the third terminal module 130, and the fourth neutral terminal 148 is circuit-connected to the fourth terminal module 140.

Preferably, the first neutral terminal 118, the second neutral terminal 128, the third neutral terminal 138, and the fourth neutral terminal 148 are disposed at intervals of 90° to be rotationally symmetrical with respect to the center C1 of the stator 30.

As described above, since the plurality of terminal modules circuit-divided from each other may be formed by commonly using one type neutral terminal, advantageous effects of minimizing the number of molds for manufacturing the plurality of terminal modules, simplifying a manufacturing process, and reducing manufacturing costs can be obtained.

More specifically, the first neutral terminal 118 may electrically connect the 1-1 phase terminal 112 (for example, of the U1-phase), the 1-2 phase terminal 114 (for example, of the V1-phase), and the 1-3 phase terminal 116 (for example, of the W1-phase). As an example, the first neutral terminal 118 may be disposed in the first quadrant among the quadrants divided based on the perpendicular axes (the x-axis and the y-axis) passing through the center C1 of the stator 30.

The second neutral terminal 128 may electrically connect the 2-1 phase terminal 122 (for example, of a U2-phase), the 2-2 phase terminal 124 (for example, of a V2-phase), and the 2-3 phase terminal 126 (for example, of a W2-phase). As an example, the second neutral terminal 128 may be disposed in the fourth quadrant among the quadrants divided based on the perpendicular axes (the x-axis and the y-axis) passing through the center C1 of the stator 30.

The third neutral terminal 138 may electrically connect the 3-1 phase terminal 132 (for example, of a U3-phase), the 3-2 phase terminal 134 (for example, of a V3-phase), and the 3-3 phase terminal 136 (for example, of a W3-phase). As an example, the third neutral terminal 138 may be disposed in the third quadrant among the quadrants divided based on the perpendicular axes (the x-axis and the y-axis) passing through the center C1 of the stator 30.

The fourth neutral terminal 148 may electrically connect the 4-1 phase terminal 142 (for example, of a U4-phase), the 4-2 phase terminal 144 (for example, of a V4-phase), and the 4-3 phase terminal 146 (for example, of a W4-phase). As an example, the fourth neutral terminal 148 may be disposed in the second quadrant among the quadrants divided based on the perpendicular axes (the x-axis and the y-axis) passing through the center C1 of the stator 30.

Preferably, the first neutral terminal 118, the second neutral terminal 128, the third neutral terminal 138, and the fourth neutral terminal 148 are formed as identical structures (identical shapes). Accordingly, since one mold can be commonly used to manufacture the plurality of neutral terminals constituting four independent terminal modules which are different from each other, there are advantages that a manufacturing process is simple, and manufacturing costs are reduced.

Figure 6:
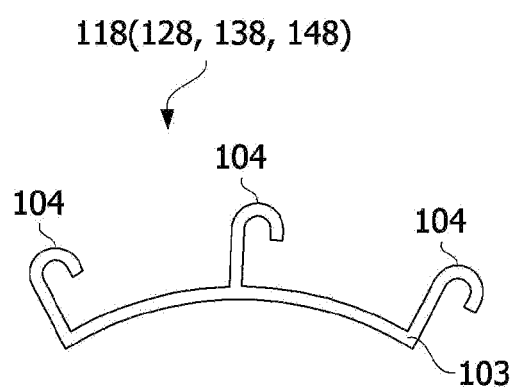
FIG. 6 is a view for describing a neutral terminal of the first busbar in the motor according to the first embodiment.

Referring to FIG. 6, each of the first neutral terminal 118, the second neutral terminal 128, the third neutral terminal 138, and the fourth neutral terminal 148 includes a neutral terminal body 103 and protruding neutral terminal parts 104 extending from the neutral terminal body 103 in the radial direction of the stator 30.

The neutral terminal body 103 may be formed in a band type member having a curved surface. The neutral terminal body 103 and the protruding neutral terminal parts 104 may be divided and described only according to shapes and functional features thereof and may be one integrally connected member.

As an example, the neutral terminal body 103 of each of the first neutral terminal 118, the second neutral terminal 128, the third neutral terminal 138, and the fourth neutral terminal 148 may be formed in the band type member having an arc shape with a predetermined curvature. In addition, the neutral terminal body 103 may be disposed in the first body 82. In addition, referring to FIG. 2, the neutral terminal body 103 may be disposed outward from the inner end portion of the phase terminal body 101 in the radial direction. Accordingly, some of the neutral terminal bodies 103 may be disposed to overlap the phase terminal bodies 101 in the axial direction. However, not all the phase terminal bodies 101 of the phase terminals are disposed to overlap the neutral terminal bodies 103 in the axial direction. For example, some of the phase terminals 112, 122, 132, and 142 may not overlap the neutral terminal bodies 103 in the axial direction.

The protruding neutral terminal parts 104 extend from the neutral terminal body 103 in the radial direction of the stator 30 and protrude outward from the first body 82. Three protruding neutral terminal parts 104 are provided on the neutral terminal body 103, and end portions of the protruding neutral terminal parts 104 are formed in bent shapes like hooks.

The protruding neutral terminal parts 104 are electrically connected to the coils 31 of the stator 30 connected to the U-phase, V-phase, and W-phase power sources. As an example, the protruding neutral terminal parts 104 may be fused to the coils 31 of the stator 30.

The neutral terminal body 103 and the protruding neutral terminal parts 104 may be formed as a single layer structure or double layer structure (multilayer structure), but the present invention is not restricted or limited by a connection structure between the neutral terminal body 103 and the protruding neutral terminal parts 104.

Meanwhile, although an example of the motor, which includes both the first busbar 80 and the second busbar 40 and in which power is applied to the coils through the second busbar 40 to which the power terminals PT are connected, has been described in the embodiment of the present invention described and illustrated above, according to another embodiment of the present invention, power terminals may also be directly connected to coils without using a separate second busbar.

Figure 10:
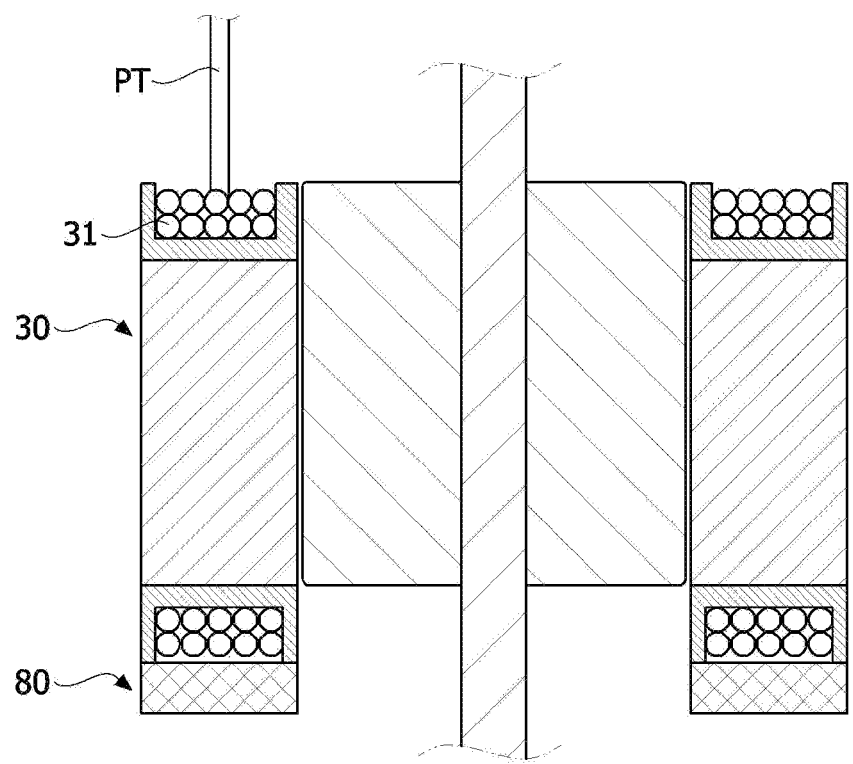
FIG. 10 is a view for describing a connection structure of a coil of a stator and a power terminal in another example of the motor according to the first embodiment.

Referring to FIG. 10, a motor includes a housing 50, a stator 30 disposed in the housing 50, a rotor 20 disposed in the stator 30, and only a first busbar 80 disposed under the stator 30, and does not include the second busbar 40 (see FIG. 9).

Power terminals PT through which U-phase, V-phase, and W-phase power is applied may be directly connected to coils of the stator 30, and the first busbar 80 includes a plurality of neutral terminals 118, 128, 138, and 148 (see FIG. 5) connected to coils 31 of the stator 30 and circuit-divided.

As described above, in the embodiment, since phase terminals (of the second busbar) for constituting a plurality of terminal modules circuit-divided from each other need not be provided, an advantageous effect of simplifying a structure and a manufacturing process of the first busbar 80 can be obtained.

In addition, since the first busbar 80 including the neutral terminals is disposed under the stator 30, space utilization of an upper portion of the stator 30 and a degree of design freedom can be improved, and the first busbar 80 for constituting a plurality of motor control circuits can be more easily disposed in the motor. Accordingly, advantageous effects of minimizing an increase in a size of the motor due to the neutral terminals for constituting the plurality of motor control circuits being mounted and contributing to miniaturization of the motor can be obtained.

Figure 11:
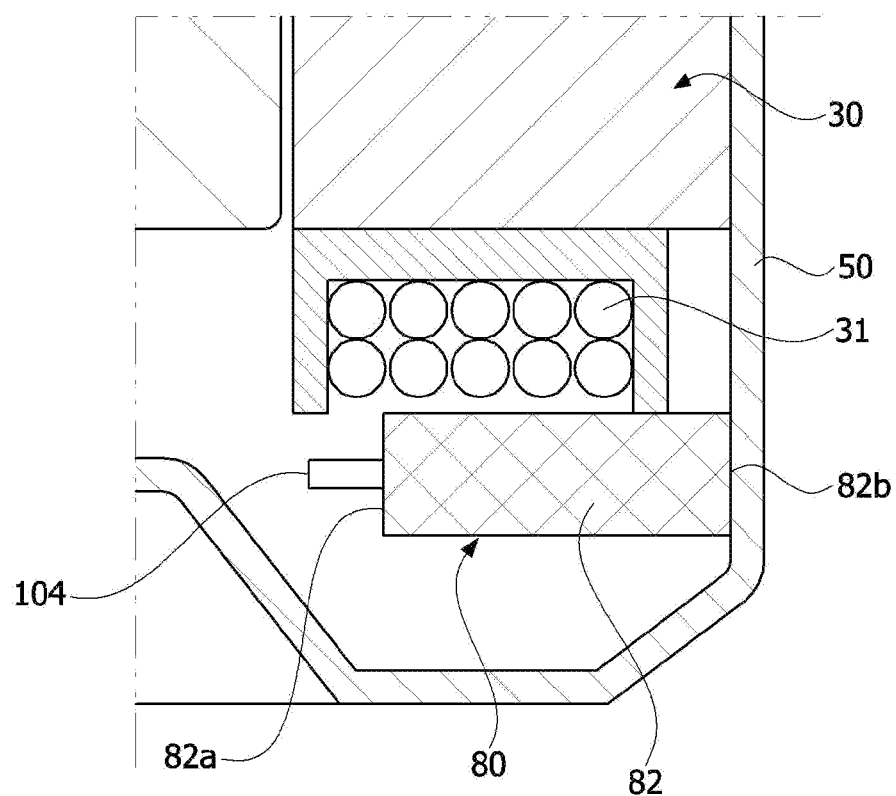
FIG. 11 is a view for describing a support structure of the first busbar in the motor according to the first embodiment.
Figure 12:
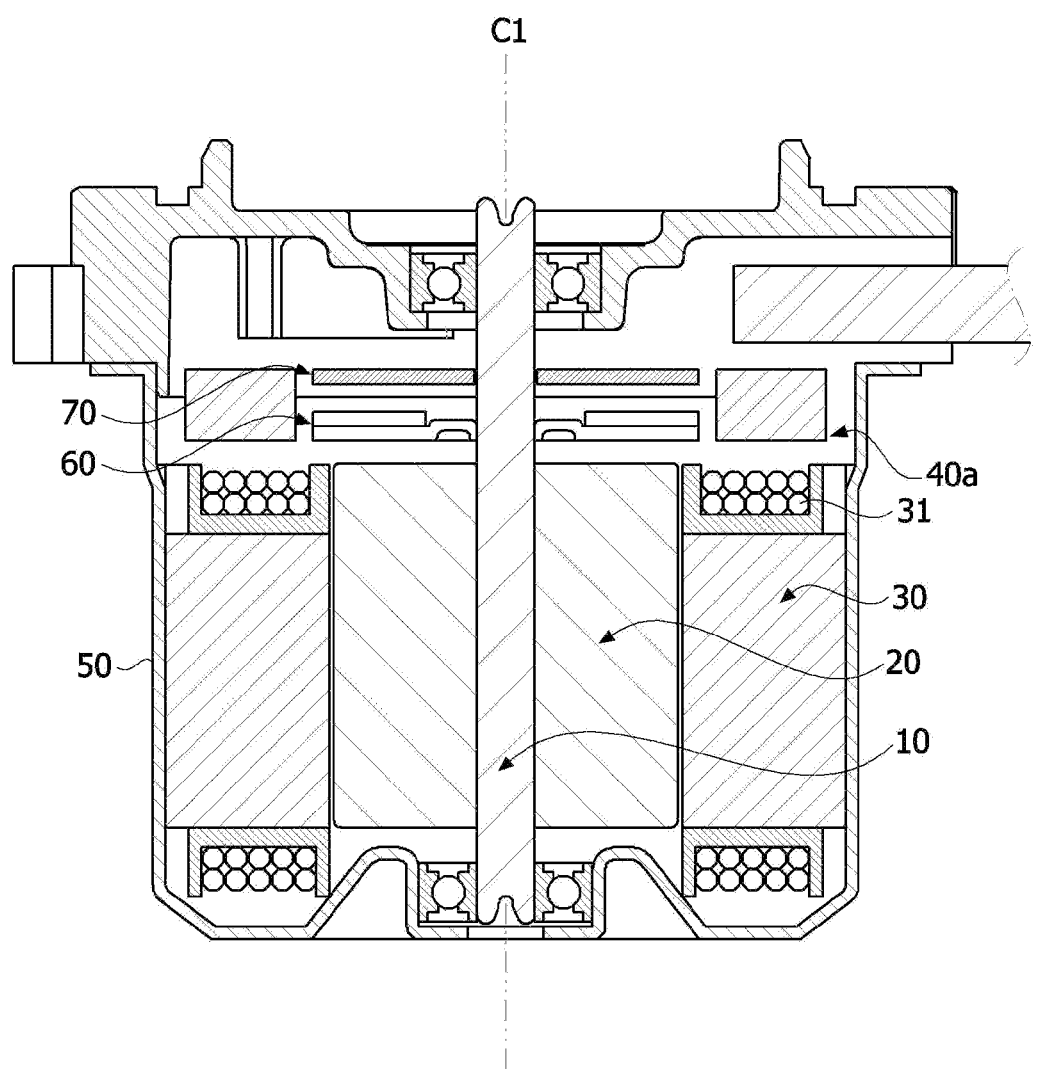
FIG. 12 is a cross-sectional view illustrating a motor according to a second embodiment.

In addition, referring to FIG. 11, according to the exemplary embodiment of the present invention, the first busbar 80 is supported by an inner surface of the housing 50.

As described above, since the first busbar 80 is supported by the inner surface of the housing 50, advantageous effects of suppressing vibration of the first busbar 80 while the motor is driven and minimizing the vibration and noise can be obtained.

The first busbar 80 may be supported by the inner surface of the housing in one of various manners according to a required condition and a design specification.

As an example, the first body 82 includes a first inner surface 82a and a first outer surface 82b, and the first outer surface 82b is supported to be pressed against the inner surface of the housing 50.

Preferably, the protruding neutral terminal part 104 protrudes toward the first inner surface 82a. As described above, since the protruding neutral terminal part 104 protrudes toward the first inner surface 82a of the first body 82, an advantageous effect of pressing the outer surface 82b of the first body 82 against the inner surface of the housing 50 without interference with the first protruding neutral terminal part 104 can be obtained.

SECOND EMBODIMENT

Referring to FIGS. 12 to 20, a motor according to a second embodiment includes a shaft 10, a rotor 20 coupled to the shaft 10, a stator 30 disposed outside the rotor 20, terminals connected to coils 31 of the stator 30, and a busbar 40a disposed on the stator 30. In this case, the busbar 40a of the motor according to the second embodiment may be disposed in the motor instead of the first busbar 80 and the second busbar 40 of the motor according to the first embodiment.

The shaft 10 may be coupled to the rotor 20. When an electromagnetic interaction occurs between the rotor 20 and the stator 30 due to the supply of a current, the rotor 20 rotates, and the shaft 10 rotates in conjunction with the rotor 20. As an example, the shaft 10 may be connected to a vehicle's steering shaft and may transmit power to the vehicle's steering shaft.

The rotor 20 rotates through an electrical interaction with the stator 30.

The rotor 20 may include a rotor core and magnets. As an example, the rotor core may be formed in a form in which a plurality of thin circular steel plates are stacked or a single container form.

A hole (not shown) to be coupled to the shaft 10 may be formed in a central portion of the rotor core. Protrusions (not shown) which guide the magnets (not shown) may protrude toward an outer circumferential surface of the rotor core. The magnets may be attached to the outer circumferential surface of the rotor core. The plurality of magnets may be disposed at predetermined intervals along a circumference of the rotor core.

In addition, the rotor 20 may include a can member (not shown) which surrounds the magnets to fix the magnets not to separate from the rotor core and inhibits the magnets from being exposed.

The stator 30 may include the coils 31 wound around the stator 30 to induce the electrical interaction with the rotor 20.

A specific structure for winding the coils 31 around the stator 30 will be described below. The stator 30 may include a stator core (not shown) including a plurality of teeth (not shown). The stator core may include an annular yoke (not shown) and the teeth which protrude from the yoke in a central direction and around which the coils 31 are wound. The teeth may be formed at predetermined intervals in a circumferential direction of the yoke. Meanwhile, the stator core may be formed by a plurality of thin steel plates being stacked. In addition, the stator core may be formed by a plurality of divided cores being coupled or connected.

In addition, the motor includes a housing 50 in which the rotor 20 and the stator 30 are accommodated.

A sensing magnet 60 is coupled to the shaft 10 to operate in conjunction with the rotor 20. The sensing magnet 60 is a device for detecting a position of the rotor 20.

A sensor which detects a magnetic force of the sensing magnet 60 may be disposed on a printed circuit board 70. As an example, the sensor may be a Hall integrated circuit (IC). In this case, the sensor detects changes in an N-pole and an S-pole of the sensing magnet 60 and generates a sensing signal.

Figure 13:
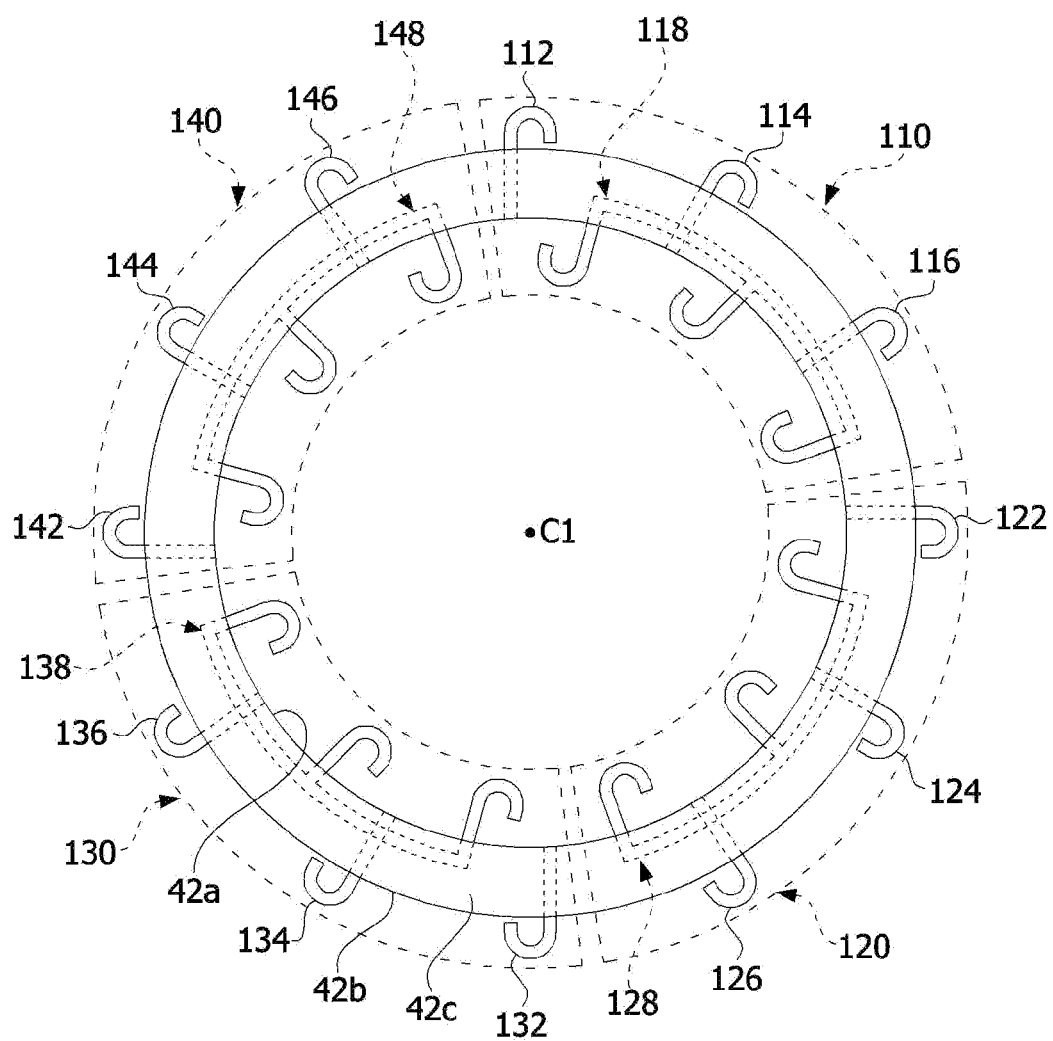
FIG. 13 is a plan view for describing a busbar in the motor according to the second embodiment.
Figure 14:
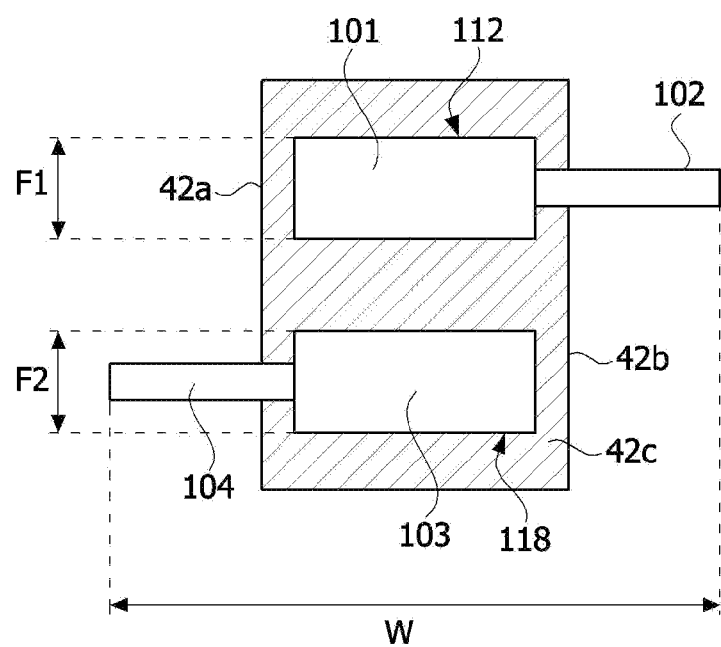
FIG. 14 is a cross-sectional view illustrating the busbar in the motor according to the second embodiment.

Referring to FIGS. 13 and 14, the busbar 40a may include a body 42c including a first inner surface 42a facing the shaft 10 and a first outer surface 42b facing an inner surface of the housing 50 and a plurality of terminal modules 110, 120, 130, and 140 connected to the coils 31 of the stator 30 and circuit-divided from each other.

The body 42c is a molded part having a ring shape formed in an injection molding manner. The body 42c includes a hole (not shown) in a central portion thereof. The plurality of terminal modules are disposed in the body 42c, and parts of end portions of the plurality of terminal modules are disposed to be exposed to the outside of the body 42c. In addition, the body 42c may have a multilayer structure or single layer structure and be integrally insert injection molded with the plurality of terminal modules 110, 120, 130, and 140.

The busbar 40a may include the plurality of terminal modules 110, 120, 130, and 140 which are circuit-divided. As an example, the plurality of terminal modules 110, 120, 130, and 140 may include phase terminals connected to U-phase, V-phase, and W-phase power sources and neutral terminals electrically connecting the phase terminals. In this case, the neutral terminals may be disposed at inner side with respect to a virtual line connecting centers of the body 42c of the busbar 40a in a radial direction. In this case, the virtual line may be a circle formed in a circumferential direction when viewed from above, and "inner side" may be a side close to a center C1 from the circle. In addition, some regions of the phase terminals may be disposed to overlap the neutral terminals in an axial direction, but the present invention is not necessarily limited thereto.

Figure 19:
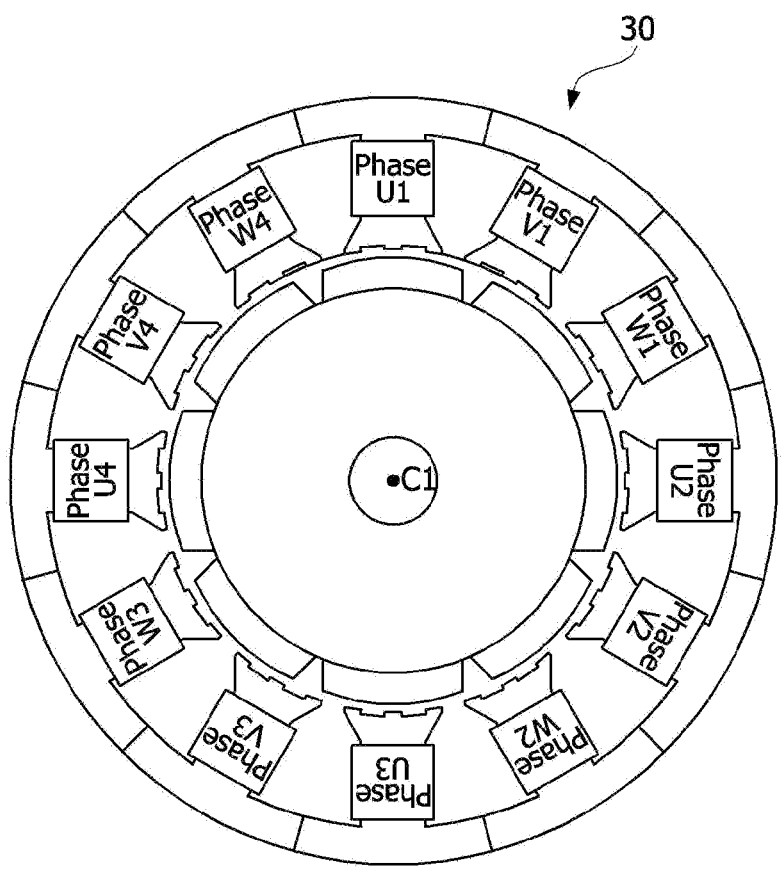
FIG. 19 is a view for describing a winding structure of a coil in the motor according to the second embodiment.
Figure 20:
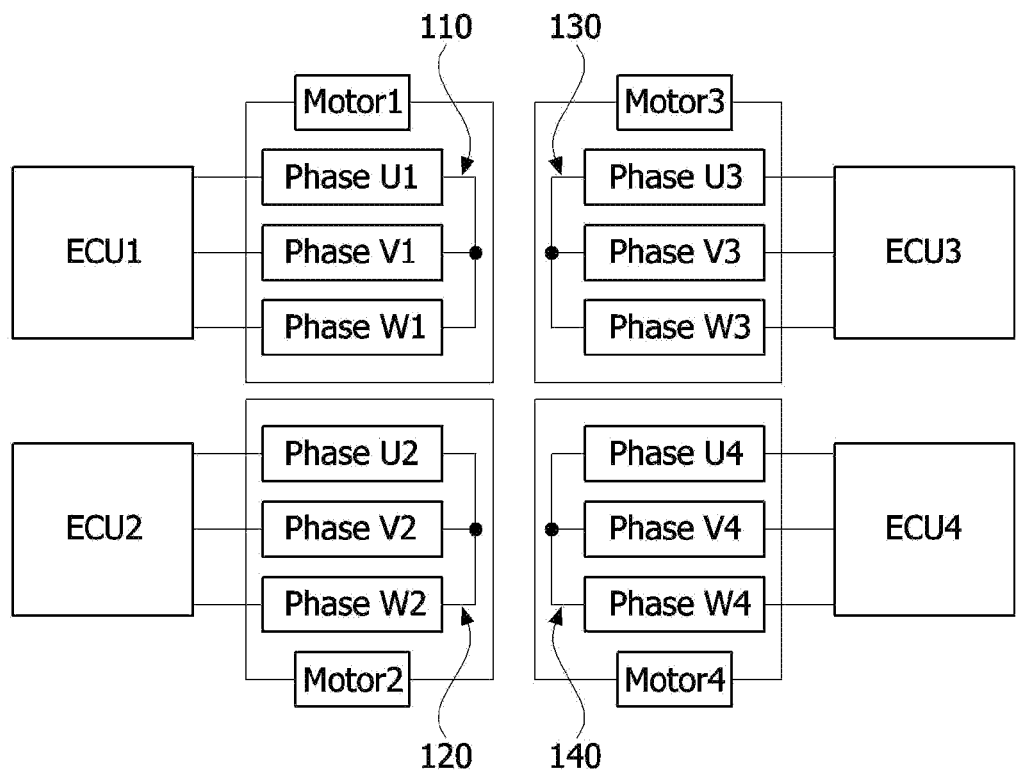
FIG. 20 is a view for describing a control circuit in the motor according to the second embodiment.

For reference, in the embodiment of the present invention, the plurality of terminal modules 110, 120, 130, and 140 being circuit-divided may be defined as the plurality of terminal modules 110, 120, 130, and 140 being connected to the coils 31 of the stator 30 but being divided and forming motor control circuits independent of each other (see FIGS. 19 and 20).

According to the exemplary embodiment, the busbar 40a includes a first terminal module 110, a second terminal module 120, a third terminal module 130, and a fourth terminal module 140 which are circuit-divided (see FIGS. 13 and 20).

For reference, although an example of the busbar 40a including four terminal modules circuit-divided has been described in the embodiment of the present invention, according to another embodiment of the present invention, a busbar may also include three or fewer or five or more terminal modules which are circuit-divided.

Preferably, the first terminal module 110, the second terminal module 120, the third terminal module 130, and the fourth terminal module 140 are disposed to be rotationally symmetrical with respect to a center C1 of the stator 30 (or a center of the busbar).

As an example, the first terminal module 110, the second terminal module 120, the third terminal module 130, and the fourth terminal module 140 are disposed at intervals of 90° to be rotationally symmetrical with respect to the center C1 of the stator 30.

That is, in order to manufacture the plurality of terminal modules 110, 120, 130, and 140 which are circuit-divided, various terminals having different shapes for each position of the terminal modules should be provided. In this case, since the number of molds for manufacturing the terminals also inevitably increases to manufacture various types of terminals, there are problems that a manufacturing process is complicated, and manufacturing costs increase.

However, in the embodiment, since only one type of terminal module can be commonly used to manufacture the plurality of terminal modules 110, 120, 130, and 140 which are circuit-divided, advantageous effects of minimizing the number of molds for manufacturing the terminal modules 110, 120, 130, and 140, simplifying a manufacturing process, and reducing manufacturing costs can be obtained.

More specifically, the first terminal module 110 includes three phase terminals and one first neutral terminal 118, the second terminal module 120 includes three phase terminals and one second neutral terminal 128, and the third terminal module 130 includes three phase terminals and one third neutral terminal 138, and the fourth terminal module 140 includes three phase terminals and one fourth neutral terminal 148.

As an example, the first terminal module 110 includes a 1-1 phase terminal 112 (for example, of a U1-phase), a 1-2 phase terminal 114 (for example, of a V1-phase), and a 1-3 phase terminal 116 (for example, of a W1-phase) which are exposed from the first outer surface 42b of the body 42c and disposed to be spaced at intervals of 30° about the center C1 of the stator 30 and the first neutral terminal 118 exposed from the first inner surface 42a of the body 42c.

The second terminal module 120 includes a 2-1 phase terminal 122 (for example, of a U2-phase), a 2-2 phase terminal 124 (for example, of a V2-phase), and a 2-3 phase terminal 126 (for example, of a W2-phase) which are exposed from the first outer surface 42b of the body 42c and disposed to be spaced at intervals of 30° about the center C1 of the stator 30 and the second neutral terminal 128 exposed from the first inner surface 42a of the body 42c.

The third terminal module 130 includes a 3-1 phase terminal 132 (for example, of a U3-phase), a 3-2 phase terminal 134 (for example, of a V3-phase), and a 3-3 phase terminal 136 (for example, of a W3-phase) which are exposed from the first outer surface 42b of the body 42c and disposed to be spaced at intervals of 30° about the center C1 of the stator 30 and the third neutral terminal 138 exposed from the first inner surface 42a of the body 42c.

The fourth terminal module 140 includes a 4-1 phase terminal 142 (for example, of a U4-phase), a 4-2 phase terminal 144 (for example, of a V4-phase), and a 4-3 phase terminal 146 (for example, of a W4-phase) which are exposed from the first outer surface 42b of the body 42c and disposed to be spaced at intervals of 30° about the center C1 of the stator 30 and the fourth neutral terminal 148 exposed from the first inner surface 42a of the body 42c.

Referring to FIG. 13, the 1-1 phase terminal 112 is disposed in a 12 o'clock direction (based on FIG. 13) about the center C1 of the stator 30, the 1-2 phase terminal 114 is disposed to be spaced 30° from the 1-1 phase terminal 112 about the center C1 of the stator 30, and the 1-3 phase terminal 116 is disposed to be spaced 30° from the 1-2 phase terminal 114 about the center C1 of the stator 30. As an example, the 1-1 phase terminal 112, the 1-2 phase terminal 114, and the 1-3 phase terminal 116 may be disposed in a first quadrant among quadrants divided based on perpendicular axes (an x-axis and a y-axis) passing through the center C1 of the stator 30.

The 2-1 phase terminal 122 is disposed in a 3 o'clock direction about the center C1 of the stator 30 (based on FIG. 13), the 2-2 phase terminal 124 is disposed to be spaced 30° from the 2-1 phase terminal 122 about the center C1 of the stator 30, and the 2-3 phase terminal 126 is disposed to be spaced 30° from the 2-2 phase terminal 124 about the center C1 of the stator 30. As an example, the 2-1 phase terminal 122, the 2-2 phase terminal 124, and the 2-3 phase terminal 126 may be disposed in a fourth quadrant among the quadrants divided based on the perpendicular axes (the x-axis and the y-axis) passing through the center C1 of the stator 30.

The 3-1 phase terminal 132 is disposed in a 6 o'clock direction (based on FIG. 13) about the center C1 of the stator 30, the 3-2 phase terminal 134 is disposed to be spaced 30° from the 3-1 phase terminal 132 about the center C1 of the stator 30, and the 3-3 phase terminal 136 is disposed 30° from the 3-2 phase terminal 134 about the center C1 of the stator 30. As an example, the 3-1 phase terminal 132, the 3-2 phase terminal 134, and the 3-3 phase terminal 136 may be disposed in a third quadrant among the quadrants divided based on the perpendicular axes (the x-axis and the y-axis) passing through the center C1 of the stator 30.

The 4-1 phase terminal 142 is disposed in a 9 o'clock direction (based on FIG. 13) about the center C1 of the stator 30, the 4-2 phase terminal 144 is disposed to be spaced 30° from the 4-1 phase terminal 142 about the center C1 of the stator 30, and the 4-3 phase terminal 146 is disposed to be spaced 30° from the 4-2 phase terminal 144 about the center C1 of the stator 30. As an example, the 4-1 phase terminal 142, the 4-2 phase terminal 144, and the 4-3 phase terminal 146 may be disposed in a second quadrant among the quadrants divided based on the perpendicular axes (the x-axis and the y-axis) passing through the center C1 of the stator 30.

More specifically, the 1-1 phase terminal 112 is disposed in the 12 o'clock direction about the center C1 of the stator 30, and the 1-2 phase terminal 114, the 1-3 phase terminal 116, the 2-1 phase terminal 122, the 2-2 phase terminal 124, the 2-3 phase terminal 126, the 3-1 phase terminal 132, the 3-2 phase terminal 134, the 3-3 phase terminal 136, the 4-1 phase terminal 142, the 4-2 phase terminal 144, and the 4-3 phase terminal 146 are sequentially disposed to be spaced at intervals of 30°.

Preferably, the 1-1 phase terminal 112, the 1-2 phase terminal 114, the 1-3 phase terminal 116, the 2-1 phase terminal 122, the 2-2 phase terminal 124, the 2-3 phase terminal 126, the 3-1 phase terminal 132, the 3-2 phase terminal 134, the 3-3 phase terminal 136, the 4-1 phase terminal 142, the 4-2 phase terminal 144, and the 4-3 phase terminal 146 are formed as identical structures (identical shapes). Accordingly, since one mold can be used to manufacture the plurality of phase terminals constituting four independent terminal modules which are different from each other, there are advantages in that a manufacturing process is simple, and manufacturing costs are reduced.

Figure 15:
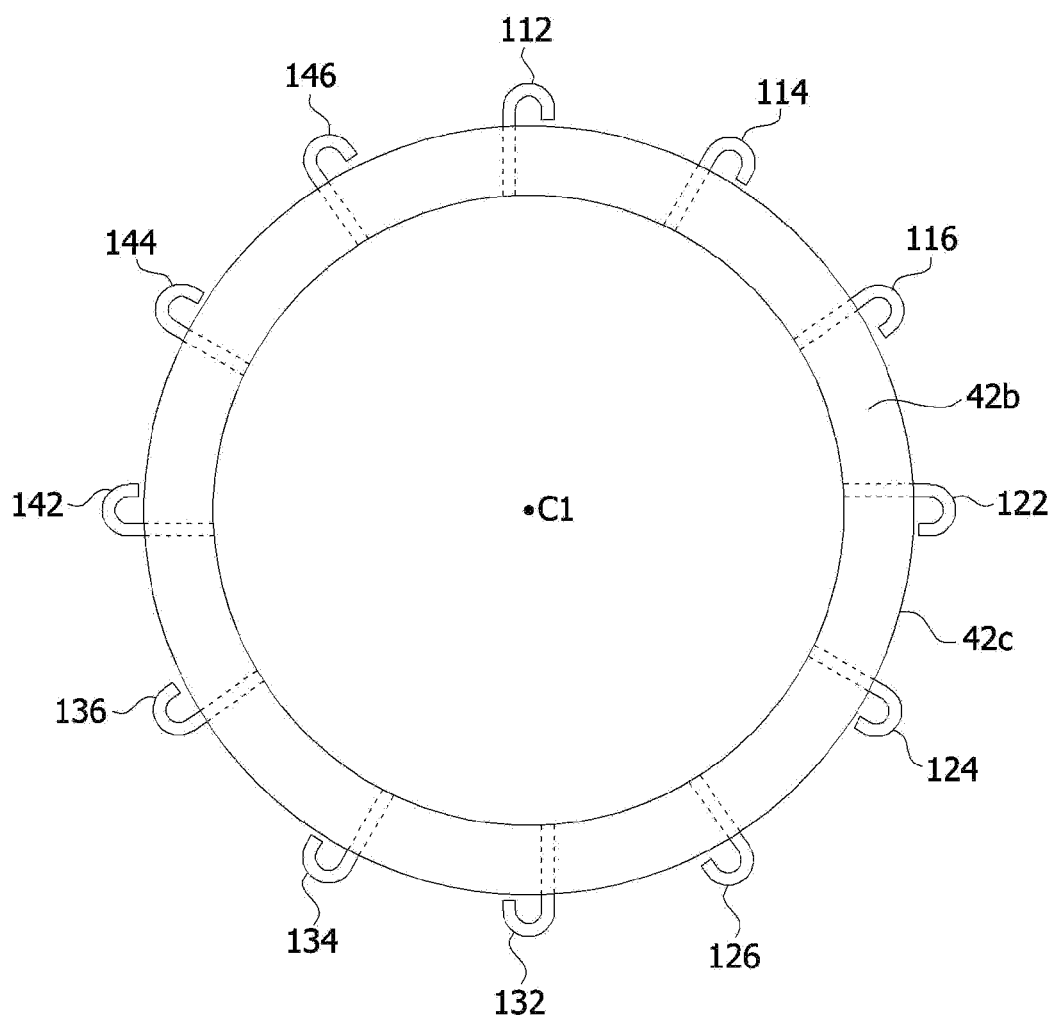
FIG. 15 is a plan view for describing the busbar on which a phase terminal is disposed in the motor according to the second embodiment.
Figure 16:
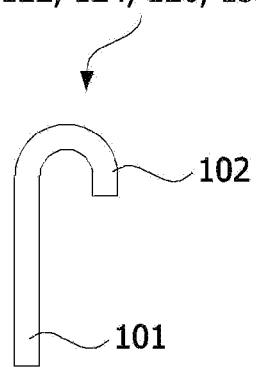
FIG. 16 is a plan view for describing the phase terminal of the busbar in the motor according to the second embodiment.

Referring to FIGS. 15 and 16, each of the plurality of phase terminals (the 1-1 phase terminal, the 1-2 phase terminal, the 1-3 phase terminal, the 2-1 phase terminal, the 2-2 phase terminal, the 2-3 phase terminal, the 3-1 phase terminal, the 3-2 phase terminal, the 3-3 phase terminal, the 4-1 phase terminal, the 4-2 phase terminal, and the 4-3 phase terminal) may include a phase terminal body 101 and a protruding phase terminal part 102 protruding from the phase terminal body 101 in the radial direction of the stator 30. Hereinafter, the phase terminal body 101 and the protruding phase terminal part 102 will be described based on the 1-1 phase terminal 112.

The phase terminal body 101 may be formed in a straight band type member (or a band type member having an arc shape with a predetermined curvature). The phase terminal body 101 and the protruding phase terminal part 102 may be divided and described only according to shapes and functional features thereof and may be one integrally connected member.

As an example, the phase terminal body 101 of the 1-1 phase terminal 112 may be formed in the straight band type member. In this case, the phase terminal bodies 101 of some of the plurality of phase terminals may be disposed to overlap the neutral terminals in the axial direction, and the phase terminal bodies 101 of the others of the plurality of phase terminals may be disposed not to overlap the neutral terminals in the axial direction. Referring to FIG. 13, some phase terminals 112, 122, 132, and 142 of the plurality of phase terminals may be disposed not to overlap the neutral terminal bodies 103 in the axial direction.

The protruding phase terminal part 102 extends from the phase terminal body 101 in the radial direction of the stator 30 and protrudes toward the first outer surface 42b of the body 42c.

An end portion of the protruding phase terminal part 102 is formed in a bent shape like a hook.

The protruding phase terminal part 102 is electrically connected to the coil 31 of the stator 30. As an example, the protruding phase terminal part 102 may be fused to the coil 31 of the stator 30.

The phase terminal body 101 and the protruding phase terminal part 102 may be formed as a single layer structure or double layer structure (multilayer structure), and the present invention is not restricted or limited by a connection structure between the phase terminal body 101 and the protruding phase terminal part 102.

The first neutral terminal 118 electrically connects the 1-1 phase terminal 112 (for example, of the U1-phase), the 1-2 phase terminal 114 (for example, of the V1-phase), and the 1-3 phase terminal 116 (for example, of the W1-phase). As an example, the first neutral terminal 118 may be disposed in the first quadrant among the quadrants divided based on the perpendicular axes (the x-axis and the y-axis) passing through the center C1 of the stator 30.

The second neutral terminal 128 electrically connects the 2-1 phase terminal 122 (for example, of the U2-phase), the 2-2 phase terminal 124 (for example, of the V2-phase), and the 2-3 phase terminal 126 (for example, the W2-phase). As an example, the second neutral terminal 128 may be disposed in the second quadrant among the quadrants divided based on the perpendicular axes (the x-axis and the y-axis) passing through the center C1 of the stator 30.

The third neutral terminal 138 electrically connects the 3-1 phase terminal 132 (for example, of the U3-phase), the 3-2 phase terminal 134 (for example, of the V3-phase), and the 3-3 phase terminal 136 (for example, of the W3-phase). As an example, the third neutral terminal 138 may be disposed in the third quadrant among the quadrants divided based on the perpendicular axes (the x-axis and the y-axis) passing through the center C1 of the stator 30.

The fourth neutral terminal 148 electrically connects the 4-1 phase terminal 142 (for example, of the U4-phase), the 4-2 phase terminal 144 (for example, of the V4-phase), and the 4-3 phase terminal 146 (for example, of the W4-phase). As an example, the fourth neutral terminal 148 may be disposed in the second quadrant among the quadrants divided based on the perpendicular axes (the x-axis and the y-axis) passing through the center C1 of the stator 30.

Preferably, the first neutral terminal 118, the second neutral terminal 128, the third neutral terminal 138, and the fourth neutral terminal 148 are formed as identical structures (identical shapes). Accordingly, since one mold can be commonly used to manufacture the plurality of neutral terminals constituting four independent terminal modules which are different from each other, there are advantages that a manufacturing process is simple, and manufacturing costs are reduced.

Figure 17:
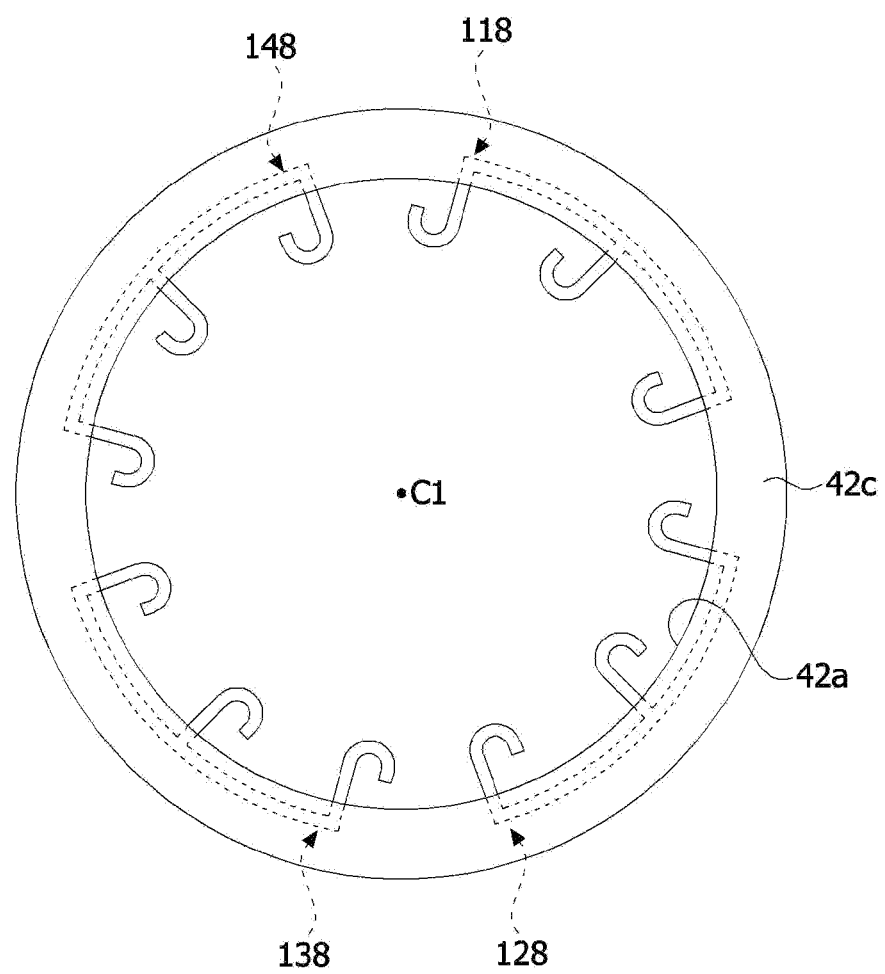
FIG. 17 is a plan view for describing the busbar in which a neutral terminal is disposed in the motor according to the second embodiment.
Figure 18:
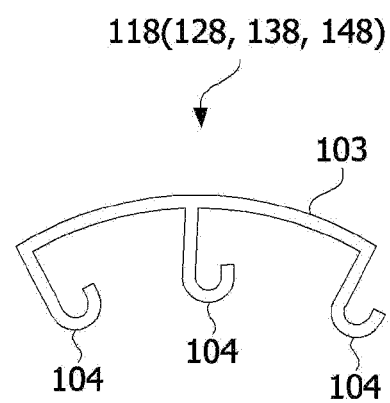
FIG. 18 is a view for describing the neutral terminal of the busbar in the motor according to the second embodiment.

Referring to FIGS. 17 and 18, each of the first neutral terminal 118, the second neutral terminal 128, the third neutral terminal 138, and the fourth neutral terminal 148 includes a neutral terminal body 103 and protruding neutral terminal parts 104 extending from the neutral terminal body 103 in the radial direction of the stator 30.

The neutral terminal body 103 may be formed in a band type member having a curved surface. The neutral terminal body 103 and the protruding neutral terminal parts 104 may be divided and described only according to shapes and functional features thereof and may be one integrally connected member.

As an example, the neutral terminal body 103 of each of the first neutral terminal 118, the second neutral terminal 128, the third neutral terminal 138, and the fourth neutral terminal 148 may be formed in the band type member having an arc shape with a predetermined curvature.

The protruding neutral terminal parts 104 extend from the neutral terminal body 103 in the radial direction of the stator 30 and protrude outward from the first inner surface 42a of the body 42c. Three protruding neutral terminal parts 104 are provided on the neutral terminal body 103, and end portions of the protruding neutral terminal parts 104 are formed in bent shapes like hooks.

The protruding neutral terminal parts 104 are electrically connected to the coils 31 of the stator 30 connected to the U-phase, V-phase, and W-phase power sources. As an example, the protruding neutral terminal parts 104 may be fused to the coils 31 of the stator 30.

The neutral terminal body 103 and the protruding neutral terminal parts 104 may be formed as a single layer structure or double layer structure (multilayer structure), but the present invention is not restricted or limited by a connection structure between the neutral terminal body 103 and the protruding neutral terminal parts 104.

As described above, in the embodiment according to the present invention, since the phase terminals 112, 114, 116, 122, 124, 126, 132, 134, and 136 are exposed from the first outer surface 42b of the body 42c, and the neutral terminals 118, 128, 138, and 148 are exposed from the first inner surface 42a of the body 42c, advantageous effects of minimizing an increase in a size of the busbar due to an increase in the numbers of the phase terminals and the neutral terminals and manufacturing a more miniaturized motor can be obtained.

That is, although all the plurality of phase terminals and the neutral terminals constituting the plurality of (for example, four) motor control circuits which are circuit-divided may also be exposed from the first outer surface of the body, in this case, since predetermined or wider widths (in the radial direction of the stator) and predetermined or higher heights (in a longitudinal direction of the shaft) of the body should be inevitably secured in order to arrange the plurality of phase terminals and the neutral terminals on the first outer surface of the body not to overlap the plurality of phase terminals and the neutral terminals, there are problems that it is difficult to form the body of which a size is smaller than or equal to a predetermined size, and an overall size of the busbar increases.

However, in the embodiment, since the phase terminals 112, 114, 116, 122, 124, 126, 132, 134, and 136 are exposed from the first outer surface 42b of the body 42c, and the neutral terminals 118, 128, 138, and 148 are exposed from the first inner surface 42a of the body 42c, the plurality of phase terminals and the neutral terminals can be disposed at the same intervals not to overlap each other even when a size of the body 42c does not increase, and thus advantageous effects of minimizing an increase in the size of the busbar 40a, improving a degree of design freedom and space utilization in the motor, and manufacturing a more miniaturized motor can be obtained.

In addition, in the embodiment, since the plurality of phase terminals 112, 114, 116, 122, 124, 126, 132, 134, and 136 and the plurality of neutral terminals 118, 128, 138, and 148 are disposed with some regions of the body 42c interposed therebetween, advantageous effects of improving insulation stability and reliability of the phase terminals and the neutral terminals and workability (of coil fusing work) can be obtained.

A layout of the phase terminals 112, 114, 116, 122, 124, 126, 132, 134, and 136 and the neutral terminals 118, 128, 138, and 148 may be variously changed according to required conditions and design specifications.

As an example, referring to FIG. 14, the phase terminal (for example, the phase terminal 112) and the neutral terminal (for example, the neutral terminal 118) may be disposed to form layers different from each other in the axial direction of the shaft 10.

More specifically, the phase terminal body 101 may be disposed to form a first layer F1 in the body 42c, and the neutral terminal body 103 may be disposed to form a second layer F2 disposed under (or on) the phase terminal body 101 in the body 42c.

As described above, since the phase terminal body 101 is disposed in the first layer F1, and the neutral terminal body 103 is disposed in the second layer F2, advantageous effects of minimizing a width W (in the radial direction of the stator) of the body 42c and reducing a use amount of a material for molding the body 42c can be obtained.

Figure 21:
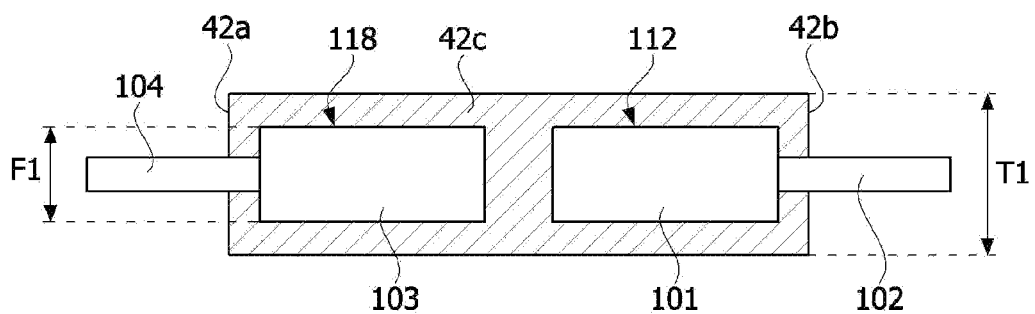
FIG. 21 is a cross-sectional view illustrating a modified example of the busbar in the motor according to the second embodiment.

As another example, referring to FIG. 21, phase terminals 112, 114, 116, 122, 124, 126, 132, 134, and 136 and neutral terminals 118, 128, 138, and 148 may also be disposed to form the same layer (for example, a first layer) in an axial direction of a shaft 10.

More specifically, a phase terminal body 101 of the phase terminal (for example, the phase terminal 112) may be disposed to form a first layer F1 in a body 42c, and a neutral terminal body 103 of the neutral terminal (for example, the neutral terminal 118) may be disposed in the first layer F1 in the body 42c.

As described above, since the phase terminal body 101 and the neutral terminal body 103 are disposed to form the one first layer F1, advantageous effects of minimizing a thickness T1 (in the axial direction of the shaft) of the body 42c and reducing a use amount of a material for molding the body 42c can be obtained.

While the present invention has been described above with reference to the exemplary embodiments, it may be understood by those skilled in the art that various modifications and changes of the present invention may be made within a range not departing from the spirit and scope of the present invention defined by the appended claims.

REFERENCE NUMERALS

| | |
|---|---|
| 10: SHAFT | 20: ROTOR |
| 30: STATOR | 31: COIL |
| 40: SECOND BUSBAR | 42: SECOND BODY |
| 50: HOUSING | 80: FIRST BUSBAR |
| 82: FIRST BODY | |

The invention claimed is:

1. A motor comprising:
   a housing;
   a stator disposed in the housing;
   a rotor disposed in the stator;
   a first busbar disposed under the stator; and
   a second busbar disposed on the stator,
   wherein the first busbar includes a plurality of neutral terminals connected to coils of the stator and circuit-divided,
   wherein the plurality of neutral terminals are disposed to be rotationally symmetrical with respect to a center of the stator,
   wherein the second busbar includes a plurality of terminal modules connected to the coils of the stator and circuit-divided, and
   wherein each of the terminal modules includes a plurality of phase terminals.

2. The motor of claim 1, wherein:
   the first busbar includes a first neutral terminal, a second neutral terminal, a third neutral terminal, and a fourth neutral terminal; and the first neutral terminal, the second neutral terminal, the third neutral terminal, and the fourth neutral terminal are disposed at intervals of 90° to be rotationally symmetrical with respect to the center of the stator.

3. The motor of claim 2, wherein the first neutral terminal, the second neutral terminal, the third neutral terminal, and the fourth neutral terminal are formed as identical structures.

4. The motor of claim 1, wherein each of the neutral terminals includes a neutral terminal body and a protruding neutral terminal part extending from the neutral terminal body in a radial direction of the stator.

5. The motor of claim 4, wherein:
the first busbar includes a first body formed to surround the plurality of neutral terminals; and
the first busbar is supported by an inner surface of the housing.

6. The motor of claim 5, wherein:
the first body includes a first inner surface and a first outer surface; and
the first outer surface is supported to be pressed against the inner surface of the housing.

7. The motor of claim 6, wherein each protruding neutral terminal part protrudes toward the first inner surface.

8. The motor of claim 1, wherein:
the second busbar includes a first terminal module circuit-connected to the first neutral terminal, a second terminal module circuit-connected to the second neutral terminal, a third terminal module circuit-connected to the third neutral terminal, and a fourth terminal module circuit-connected to the fourth neutral terminal; and
the first terminal module, the second terminal module, the third terminal module, and the fourth terminal module are disposed to be rotationally symmetrical with respect to the center of the stator.

9. The motor of claim 8, wherein:
the first terminal module includes a 1-1 phase terminal, a 1-2 phase terminal, and a 1-3 phase terminal that are disposed to be spaced at intervals of 30° about the center of the stator;
the second terminal module includes a 2-1 phase terminal, a 2-2 phase terminal, and a 2-3 phase terminal that are disposed to be spaced at intervals of 30° about the center of the stator;
the third terminal module includes a 3-1 phase terminal, a 3-2 phase terminal, and a 3-3 phase terminal that are disposed to be spaced at intervals of 30° about the center of the stator; and
the fourth terminal module includes a 4-1 phase terminal, a 4-2 phase terminal, and a 4-3 phase terminal that are disposed to be spaced at intervals of 30° about the center of the stator.

10. The motor of claim 9, wherein the 1-1 phase terminal, the 1-2 phase terminal, the 1-3 phase terminal, the 2-1 phase terminal, the 2-2 phase terminal, the 2-3 phase terminal, the 3-1 phase terminal, the 3-2 phase terminal, the 3-3 phase terminal, the 4-1 phase terminal, the 4-2 phase terminal, and the 4-3 phase terminal are formed as identical structures.

11. The motor of claim 1, wherein:
the second busbar includes a second mold formed to surround the plurality of phase terminals; and
each of the phase terminals includes a phase terminal body and a protruding phase terminal part extending from the phase terminal body in a radial direction of the stator.

12. A motor comprising:
a shaft;
a rotor coupled to the shaft;
a stator disposed outside the rotor; and
a busbar disposed on the stator,
wherein the busbar includes a body including a first inner surface and a first outer surface and a plurality of terminal modules connected to coils of the stator and circuit-divided, and
the terminal modules include phase terminals exposed from the first outer surface and neutral terminals exposed from the first inner surface.

13. The motor of claim 12, wherein:
the busbar includes a first terminal module, a second terminal module, a third terminal module, and a fourth terminal module; and
the first terminal module, the second terminal module, the third terminal module, and the fourth terminal module are disposed at intervals of 90° to be rotationally symmetrical with respect to a center of the stator.

14. The motor of claim 13, wherein:
the first terminal module includes a 1-1 phase terminal, a 1-2 phase terminal, and a 1-3 phase terminal that are exposed from the first outer surface and a first neutral terminal exposed from the first inner surface;
the second terminal module includes a 2-1 phase terminal, a 2-2 phase terminal, and a 2-3 phase terminal that are exposed from the first outer surface and a second neutral terminal exposed from the first inner surface;
the third terminal module includes a 3-1 phase terminal, a 3-2 phase terminal, and a 3-3 phase terminal that are exposed from the first outer surface and a third neutral terminal exposed from the first inner surface; and
the fourth terminal module includes a 4-1 phase terminal, a 4-2 phase terminal, and a 4-3 phase terminal that are exposed from the first outer surface and a fourth neutral terminal exposed from the first inner surface.

15. The motor of claim 14, wherein:
the 1-1 phase terminal, the 2-1 phase terminal, the 3-1 phase terminal, and the 4-1 phase terminal are formed as identical structures;
the 1-2 phase terminal, the 2-2 phase terminal, the 3-2 phase terminal, and the 4-2 phase terminal are formed as identical structures;
the 1-3 phase terminal, the 2-3 phase terminal, the 3-3 phase terminal, and the 4-3 phase terminal are formed as identical structures; and
the first neutral terminal, the second neutral terminal, the third neutral terminal, and the fourth neutral terminal are formed as identical structures.

16. The motor of claim 12, wherein each of the phase terminals includes a phase terminal body disposed in the body and a protruding phase terminal part extending from the phase terminal body and protruding from the first outer surface in a radial direction of the stator; and
each of the neutral terminals includes a neutral terminal body disposed in the body and a protruding neutral terminal part extending from the neutral terminal body and protruding from the first inner surface in the radial direction of the stator.

17. The motor of claim 16, wherein the phase terminals and the neutral terminals are disposed to form layers different from each other in an axial direction of the shaft.

18. The motor of claim 16, wherein the phase terminals and the neutral terminals are disposed to form the same layer in an axial direction of the shaft.

* * * * *